United States Patent
Kim et al.

(10) Patent No.: US 10,181,936 B2
(45) Date of Patent: Jan. 15, 2019

(54) METHOD FOR TRANSMITTING UPLINK CONTROL INFORMATION, USER EQUIPMENT, METHOD FOR RECEIVING UPLINK CONTROL INFORMATION, AND BASE STATION

(71) Applicant: LG ELECTRONICS INC., Seoul (KR)

(72) Inventors: Hakseong Kim, Anyang-si (KR); Hanbyul Seo, Anyang-si (KR); Kijun Kim, Anyang-si (KR); Jonghyun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 211 days.

(21) Appl. No.: 15/094,855

(22) Filed: Apr. 8, 2016

(65) Prior Publication Data
US 2016/0226645 A1    Aug. 4, 2016

Related U.S. Application Data

(63) Continuation of application No. 14/239,761, filed as application No. PCT/KR2012/006493 on Aug. 16, 2012, now Pat. No. 9,337,984.
(Continued)

(51) Int. Cl.
| | | |
|---|---|---|
| *H04W 72/04* | (2009.01) | |
| *H04L 5/00* | (2006.01) | |
| *H04L 1/18* | (2006.01) | |

(52) U.S. Cl.
CPC .......... *H04L 5/0055* (2013.01); *H04L 1/1861* (2013.01); *H04L 1/1896* (2013.01); *H04W 72/042* (2013.01); *H04W 72/0413* (2013.01)

(58) Field of Classification Search
CPC ...... H04L 5/005; H04L 5/0055; H04L 1/1861
See application file for complete search history.

(56) References Cited

U.S. PATENT DOCUMENTS

| | | |
|---|---|---|
| 2009/0245194 A1 | 10/2009 | Damnjanovic et al. |
| 2011/0223924 A1 | 9/2011 | Lohr et al. |

(Continued)

FOREIGN PATENT DOCUMENTS

| | | |
|---|---|---|
| KR | 1020090083269 | 8/2009 |
| KR | 1020110083459 | 7/2011 |

(Continued)

OTHER PUBLICATIONS

PCT International Application No. PCT/KR2012/006493, Written Opinion of the International Searching Authority dated Feb. 19, 2013, 17 pages.

*Primary Examiner* — Robert M Morlan
*Assistant Examiner* — Pamit Kaur
(74) *Attorney, Agent, or Firm* — Lee Hong Degerman Kang Waimey

(57) ABSTRACT

In the present invention, a physical uplink control channel (PUCCH) resource, which is used for transmitting acknowledgement/negative ACK (ACK/NACK) information related to downlink control information, is determined on the basis of $n^{(1)}_{PUCCH}=f(n_{CCE},N^{(1)}_{PUCCH},X)$, when the format of the downlink control information that is transmitted/received through a physical downlink control channel (PDCCH) is in accordance with a transmission mode of a user equipment, wherein $n^{(1)}_{PUCCH}$ is a PUCCH resource index, $N^{(1)}_{PUCCH}$ is a value which is received from the base station, $n_{CCE}$ is a first control channel element (CCE) index in the PDCCH, X is a parameter which is not the $n_{CCE}$ and the $N^{(1)}_{PUCCH}$, and wherein f is a function having the $n_{CCE}$, $N^{(1)}_{PUCCH}$, and the X as a factor.

20 Claims, 12 Drawing Sheets

Related U.S. Application Data

(60) Provisional application No. 61/525,207, filed on Aug. 19, 2011, provisional application No. 61/527,128, filed on Aug. 25, 2011, provisional application No. 61/529,219, filed on Aug. 30, 2011, provisional application No. 61/536,028, filed on Sep. 18, 2011, provisional application No. 61/539,959, filed on Sep. 27, 2011, provisional application No. 61/541,045, filed on Sep. 29, 2011, provisional application No. 61/650,481, filed on May 23, 2012.

(56) References Cited

U.S. PATENT DOCUMENTS

| | | | |
|---|---|---|---|
| 2011/0235599 A1* | 9/2011 | Nam | H04L 1/0027 370/329 |
| 2011/0249633 A1* | 10/2011 | Hong | H04L 5/0053 370/329 |
| 2012/0002593 A1 | 1/2012 | Kim et al. | |
| 2012/0250742 A1 | 10/2012 | Tiirola et al. | |

FOREIGN PATENT DOCUMENTS

| | | |
|---|---|---|
| WO | 2010110598 | 9/2010 |
| WO | 2011122837 | 10/2011 |

* cited by examiner

FIG. 9
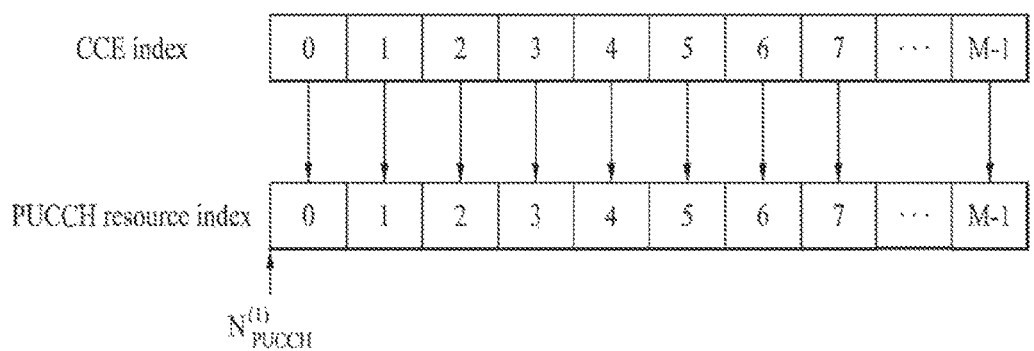
(a) M CCEs to M PUCCH resources mapping
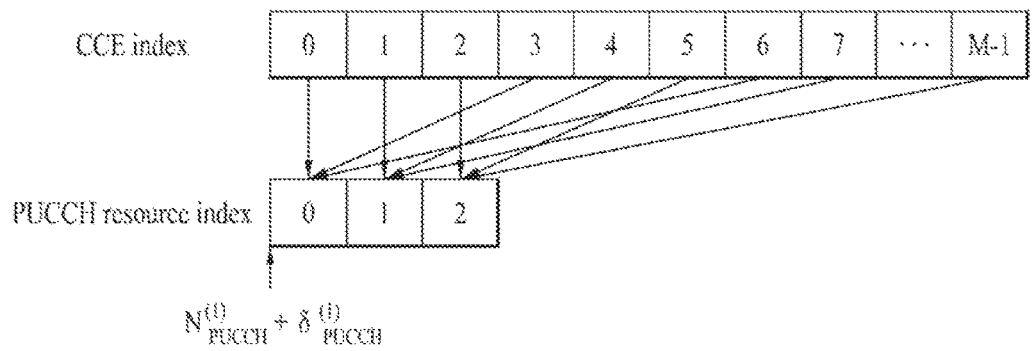
(b) M CCEs to N PUCCH resources mapping (N < M)

METHOD FOR TRANSMITTING UPLINK CONTROL INFORMATION, USER EQUIPMENT, METHOD FOR RECEIVING UPLINK CONTROL INFORMATION, AND BASE STATION

CROSS-REFERENCE TO RELATED APPLICATIONS

This application is a continuation of U.S. application Ser. No. 14/239,761, filed on Feb. 19, 2014, now U.S. Pat. No. 9,337,984, which is the National Stage filing under 35 U.S.C. 371 of International Application No. PCT/KR2012/006493, filed on Aug. 16, 2012, which claims the benefit of U.S. Provisional Application No. 61/525,207, filed on Aug. 19, 2011, 61/527,128, filed on Aug. 25, 2011, 61/529,219, filed on Aug. 30, 2011, 61/536,028, filed on Sep. 18, 2011, 61/539,959, filed on Sep. 27, 2011, 61/541,045, filed on Sep. 29, 2011, and 61/650,481, filed on May 23, 2012, the contents of which are all hereby incorporated by reference herein in their entirety.

TECHNICAL FIELD

The present invention relates to a wireless communication system. Specifically, the present invention relates to a method and apparatus for transmitting an uplink signal and a method and apparatus for receiving an uplink signal.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-eNB cooperation technology, etc. for raising data capacity transmitted on limited frequency resources have been developed. In addition, a communication environment has evolved into increasing density of nodes accessible by a user equipment (UE) at the periphery of the nodes. A node refers to a fixed point capable of transmitting/receiving a radio signal to/from a UE through one or more antennas. A communication system including high-density nodes may provide a better communication service to the UE through cooperation between the nodes.

Such a multi-node cooperative communication scheme in which a plurality of nodes performs communication with the UE using the same time-frequency resource has much better data throughput than a conventional communication scheme in which the nodes perform communication with the UE without any cooperation by operating as independent eNBs.

A multi-node system performs cooperative communication using a plurality of nodes, each node operating as an eNB, an access point, an antenna, an antenna group, a radio remote header (RRH), or a radio remote unit (RRU). Unlike a conventional centralized antenna system in which antennas converge upon an eNB, the nodes are typically separated from each other by a predetermined interval or more in the multi-node system. The nodes may be managed by one or more eNBs or eNB controllers for controlling the operation thereof or scheduling data transmission/reception therethrough. Each node is connected to the eNB or eNB controller for managing the node through a cable or a dedicated line.

Such a multi-node system may be regarded as a type of MIMO system in that distributed nodes are capable of communicating with a single or multiple UEs by simultaneously transmitting/receiving different streams. However, since the multi-node system transmits signals using nodes distributed at various locations, a transmission region which should be covered by each antenna decreases in comparison with antennas included in the conventional centralized antenna system. Accordingly, compared with a conventional system implementing MIMO technology in the centralized antenna system, a transmit power needed when each antenna transmits a signal may be reduced in the multi-node system. In addition, since the transmission distance between an antenna and a UE is shortened, path loss is reduced and high-speed data transmission is achieved. Therefore, transmission capacity and power efficiency of a cellular system can be enhanced and relatively uniform quality of communication performance can be satisfied irrespective of the locations of UEs in a cell. Furthermore, in the multi-node system, since an eNB(s) or eNB controller(s) connected to multiple nodes performs cooperative data transmission/reception, signal loss generated in a transmission process is reduced. In addition, when nodes distant from each other by a predetermined distance or more perform cooperative communication with the UE, correlation and interference between antennas are reduced. Hence, according to the multi-node cooperative communication scheme, a high signal to interference-plus-noise ratio (SINR) can be achieved.

Due to such advantages of the multi-node system, in the next-generation mobile communication system, the multi-node system has emerged as a new basis of cellular communication through combination with or by replacing conventional centralized antenna systems in order to reduce additional installation costs of an eNB and maintenance costs of a backhaul network and simultaneously to expand service coverage and enhance channel capacity and SINR.

DETAILED DESCRIPTION OF THE INVENTION

Technical Problems

Due to introduction of new radio communication technology, the number of user equipments (UEs) to which an eNB should provide a service in a prescribed resource region increases and the amount of uplink data and uplink control information that the BS should receive from the UEs increases. Since the amount of resources available to the BS for communication with the UE(s) is finite, a new method in which the BS efficiently receives uplink data and/or uplink control information using the finite radio resources is needed.

Accordingly, the present invention provides a method and apparatus for efficiently transmitting/receiving an uplink signal.

The technical objects that can be achieved through the present invention are not limited to what has been particularly described hereinabove and other technical objects not described herein will be more clearly understood by persons skilled in the art from the following detailed description.

Technical Solutions

As an aspect of the present invention, provided herein are a method and a user equipment for transmitting an uplink signal to a base station in a wireless communication system. The method includes receiving downlink control information from the base station through a physical downlink control channel (PDCCH); and transmitting acknowledgement/negative acknowledgement (ACK/NACK) information associated with the downlink control information to the base station, wherein, when a format of the downlink control information is a first format according to a transmission mode of the user equipment, the ACK/NACK information is transmitted using a physical uplink control channel (PUCCH) resource determined based on "[Equation 1] $n^{(1)}_{PUCCH}=f(n_{CCE},N^{(1)}_{PUCCH},X)$" where $n^{(1)}_{PUCCH}$ is a PUCCH resource index, $N^{(1)}_{PUCCH}$ is a value received from the base station, $n_{CCE}$ is an index of a first control channel element (CCE) in the PDCCH, X is a parameter other than $n_{CCE}$ and $N^{(1)}_{PUCCH}$, and f is a function having $n_{CCE}$, $N^{(1)}_{PUCCH}$, and X as arguments.

As another aspect of the present invention, provided herein are a method and a base station for receiving an uplink signal from a user equipment in a wireless communication system. The method includes transmitting downlink control information to the user equipment through a physical downlink control channel (PDCCH); and receiving acknowledgement/negative acknowledgement (ACK/NACK) information associated with the downlink control information from the user equipment, wherein, when a format of the downlink control information is a first format according to a transmission mode of the user equipment, the ACK/NACK information is received using a physical uplink control channel (PUCCH) resource determined based on "[Equation 1] $n^{(1)}_{PUCCH}=f(n_{CCE},N^{(1)}_{PUCCH},X)$" where $n^{(1)}_{PUCCH}$ is a PUCCH resource index, $N^{(1)}_{PUCCH}$ is a value received from the base station, $n_{CCE}$ is an index of a first control channel element (CCE) in the PDCCH, X is a parameter other than $n_{CCE}$ and $N^{(1)}_{PUCCH}$, and f is a function having $n_{CCE}$, $N^{(1)}_{PUCCH}$, and X as arguments.

In each aspect of the present invention, a value corresponding to X may be further transmitted to the user equipment from the base station.

In each aspect of the present invention, X may correspond to an index of a start PUCCH resource among PUCCH resources configured for the first format.

In each aspect of the present invention, information indicating the transmission mode may be further transmitted to the user equipment from the base station.

In each aspect of the present invention, when the format of the downlink control information is a second format rather than the first format, the ACK/NACK information may be transmitted to the base station from the user equipment using at least one of a PUCCH resource determined based on "[Equation 2] $n^{(1)}_{PUCCH}=n_{CCE}+N^{(1)}_{PUCCH}$" and a PUCCH resource determined based on "[Equation 3] $n^{(1)}_{PUCCH}=n_{CCE}+1+N^{(1)}_{PUCCH}$".

In each aspect of the present invention, f may be a function for mapping M (where M is a positive integer) CCEs to N (where N is a positive integer less than M) PUCCH resources.

As still another aspect of the present invention, provided herein are a method and a user equipment for transmitting an uplink signal to a base station in a wireless communication system. The method includes receiving a higher-layer signal including a plurality of parameter sets from the base station; receiving information indicating a specific parameter set among the parameter sets from the base station through a physical downlink shared channel (PDSCH); and transmitting the uplink signal generated using a parameter in the specific parameter set to the base station.

As a further aspect of the present invention, provided herein are a method and a base station for receiving an uplink signal from a user equipment in a wireless communication system. The method includes transmitting a higher-layer signal including a plurality of parameter sets to the user equipment; transmitting information indicating a specific parameter set among the parameter sets to the user equipment through a physical downlink shared channel (PDSCH); and receiving the uplink signal generated using a parameter in the specific parameter set from the user equipment.

In each aspect of the present invention, each of the parameter sets may include at least one of a cell identifier for determining a base sequence index, a cell identifier for initializing a cyclic shift hopping pattern, and a physical uplink control channel (PUCCH) resource index offset.

In each aspect of the present invention, the information indicating the specific parameter set may correspond to n bits added to a downlink control information (DCI) format.

In each aspect of the present invention, information indicating enablement or disablement of the parameter sets may be transmitted to the user equipment from the base station. When the parameter sets are disabled, a predefined parameter set may be used.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, when a cell transmitting a downlink signal is different from a cell receiving an uplink signal, the risk of collision between PUCCH resources can be prevented.

According to the present invention, efficiency of use of uplink/downlink resources can be enhanced.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

FIG. 9 illustrates an example of determining one PUCCH resource among new PUCCH resources configured according to an embodiment of the present invention.

BEST MODE FOR CARRYING OUT THE INVENTION

Figure 1:
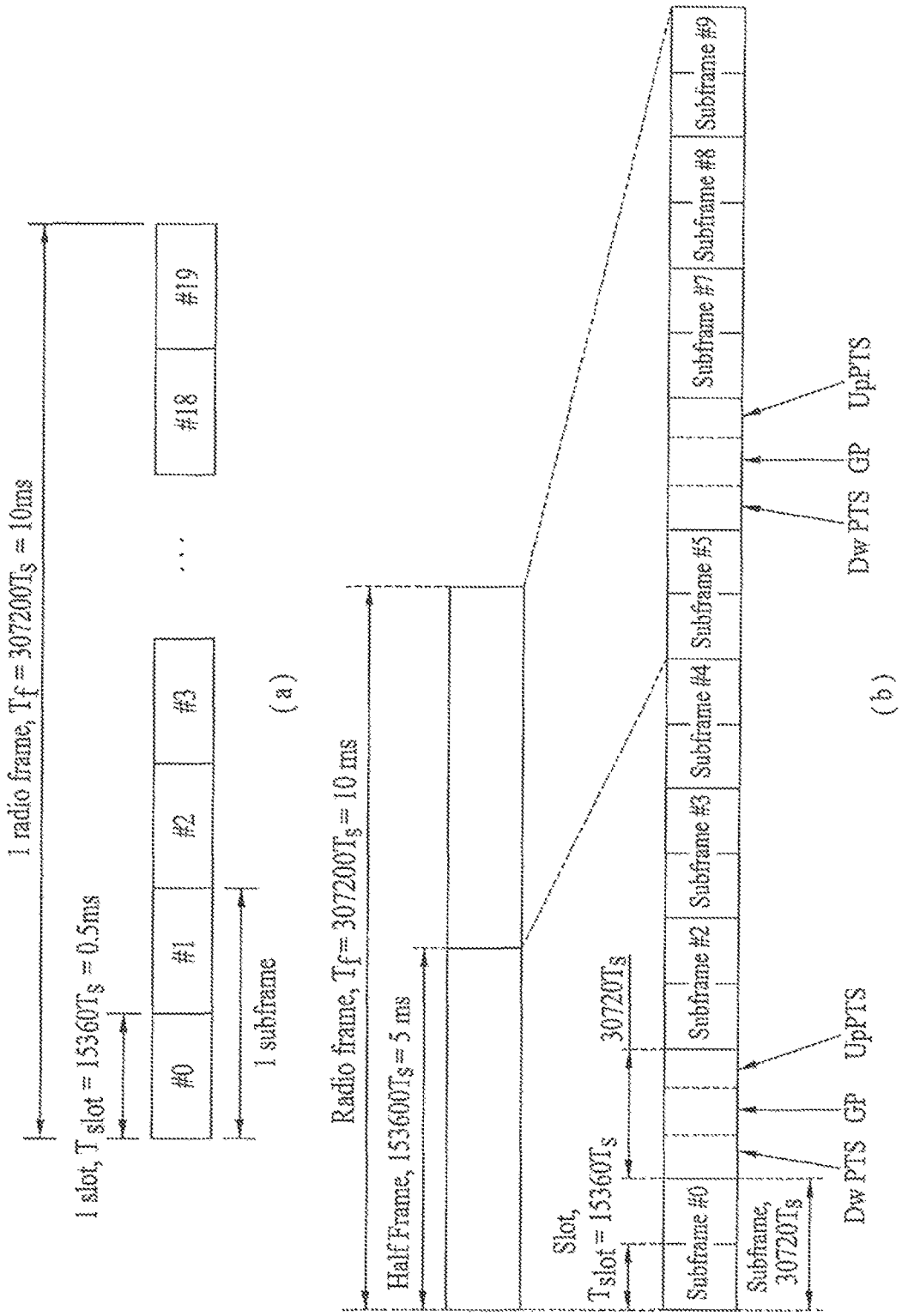
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a base station (BS) generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Hereinafter, a BS is referred to as an eNB.

In the present invention, a node refers to a fixed point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, a node may not be an eNB. For example, a radio remote head (RRH) or a radio remote unit (RRU) may be a node. The RRH or RRU generally has a lower power level than a power level of an eNB. Since the RRH or RRU (hereinafter, an RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point. Unlike a conventional centralized antenna system (CAS) (i.e. a single-node system) including antennas which converge upon an eNB and are controlled by one eNB controller, a multi-node system includes a plurality of nodes separated from one another by a predetermined distance or more. The plural nodes may be managed by one or more eNBs or eNB controllers for controlling operation thereof or scheduling data transmission/reception therethrough. Each node may be connected to an eNB or eNB controller for managing the node through a cable or a dedicated line. In the multi-node system, the same cell identifier (ID) or different cell IDs may be used to transmit/receive signals to/from a plurality of nodes. If the plural nodes have the same cell ID, each of the nodes operates as a partial antenna group of one cell. If the nodes have different cell IDs in the multi-node system, the multi-node system may be regarded as a multi-cell (e.g. a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

In the multi-node system of the present invention, which will be described below, one or more eNBs or eNB controllers, connected to a plurality of nodes, may control the plural nodes to simultaneously transmit or receive signals to or from a UE through some or all of the plural nodes. Although there is a difference between multi-node systems according to the nature of each node and implementation form of each node, the multi-node systems are different from single-node systems (e.g. a CAS, a conventional MIMO system, a conventional relay system, a conventional repeater system, etc.), in that plural nodes participate in providing a communication service to a UE on a predetermined time-frequency resource. Accordingly, embodiments of the present invention regarding a method for performing cooperative data transmission using some or all of plural nodes may be applied to various types of multi-node systems. For example, while a node generally refers to an antenna group separated by a predetermined interval or more from another node, the embodiments of the present invention, which will be described later, may be applied even when a node means an arbitrary antenna group irrespective of how far the node is separated from another node. For example, when an eNB includes a cross polarized (X-pole) antenna, the embodiments of the present invention are applicable under the assumption that the eNB controls a node including a horizontally polarized (H-pole) antenna and a node including a vertically polarized (V-pole) antenna.

A communication scheme capable of transmitting/receiving a signal through a plurality of transmission (TX)/reception (RX) nodes, transmitting/receiving a signal through at least one node selected from among a plurality of TX/RX nodes, or differentiating a node transmitting a downlink signal from a node receiving an uplink signal is referred to as multi-eNB MIMO or coordinated multi-point TX/RX (COMP). A coordinated transmission scheme of such coordinated communication between nodes may be classified largely into joint processing (JP) and scheduling coordination (CB). The JP scheme may further be divided into joint transmission (JT) and dynamic point selection (DPS) and the CB scheme may further be divided into coordinated scheduling (CS) and coordinated beamforming (CB). DPS may also be called dynamic cell selection (DCS). When JP is performed compared with other communication schemes among coordination communication schemes between nodes, a wider variety of communication environments may be formed. JT of the JP scheme is a communication scheme for transmitting the same stream to a UE from a plurality of nodes. The UE restores the stream by combining signals received from the plural nodes. JT can improve reliability of signal transmission using transmit diversity because the same stream is transmitted by plural nodes. DPS of the JP scheme is a communication scheme for transmitting/receiving a signal through one node selected according to a specific rule from among a plurality of nodes. In DPS, since a node having a good channel state with a UE will typically be selected as a communication node, reliability of signal transmission can be improved.

Meanwhile, in the present invention, a cell refers to a prescribed geographical area to which one or more nodes provide a communication service. Accordingly, in the present invention, communicating with a specific cell may mean communicating with an eNB or a node which provides a communication service to the specific cell. In addition, a downlink/uplink signal of a specific cell refers to a downlink/uplink signal from/to an eNB or a node which provides a communication service to the specific cell. Furthermore, channel status/quality of a specific cell refers to channel status/quality of a channel or communication link formed between an eNB or node which provides a communication service to the specific cell and a UE. In a 3GPP LTE-A based system, the UE may measure a downlink channel state from a specific node using a channel state information-reference signal(s) (CSI-RS(s)) transmitted on a CSI-RS resource allocated to the specific node by an antenna port(s) of the specific node. Generally, neighboring nodes transmit corresponding CSI-RSs on orthogonal CSI-RS resources. When CSI-RS resources are orthogonal, this mean that CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or Resource Elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH) and a physical uplink shared channel (PUSCH) refer to a set of time-frequency resources or REs carrying uplink control information (UCI) and a set of time-frequency resources or REs uplink data, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH transmission of a UE is conceptually identical to UCI/uplink data/random access signal transmission on PUSCH/PUCCH, respectively. In addition, PDCCH/PCFICH/PHICH/PDSCH transmission of an eNB is conceptually identical to downlink data/DCI transmission on PDCCH/PCFICH/PHICH/PDSCH, respectively.

FIG. 1 illustrates the structure of a radio frame used in a wireless communication system. Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE(-A) radio frame is 10 ms ($307,200T_s$) in duration. The radio frame is divided into 10 subframes of equal size. Subframe numbers may be assigned to the 10 subframes within one radio frame, respectively. Here, $T_s$ denotes sampling time where $T_s=1/(2048*15 \text{ kHz})$. Each subframe is 1 ms long and further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since downlink (DL) transmission and uplink (UL) transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL configuration | Downlink-to-Uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 2:
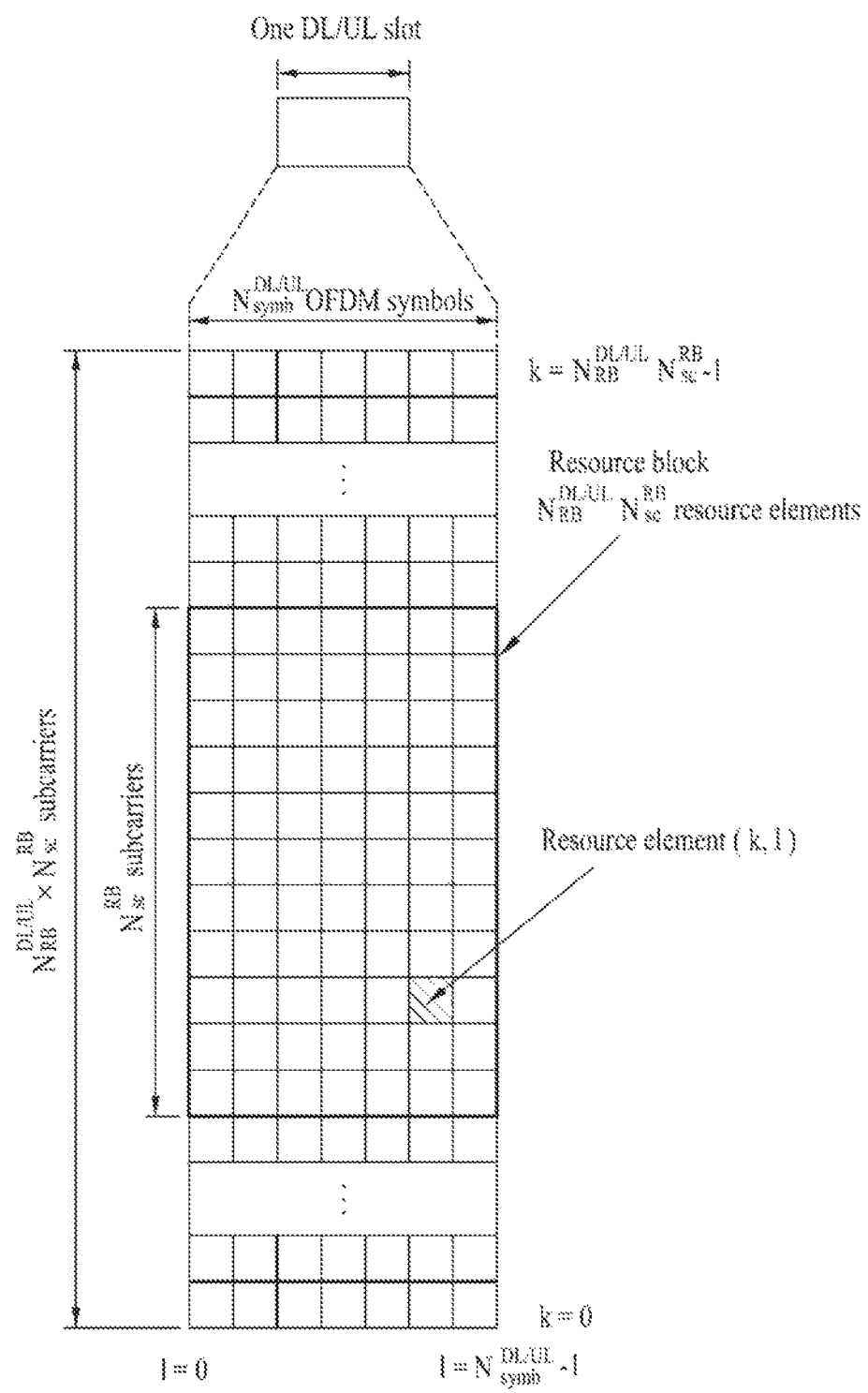
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE(-A) system. One resource grid is defined per antenna port.

A slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of resource blocks (RBs) in a DL slot and $N^{DL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
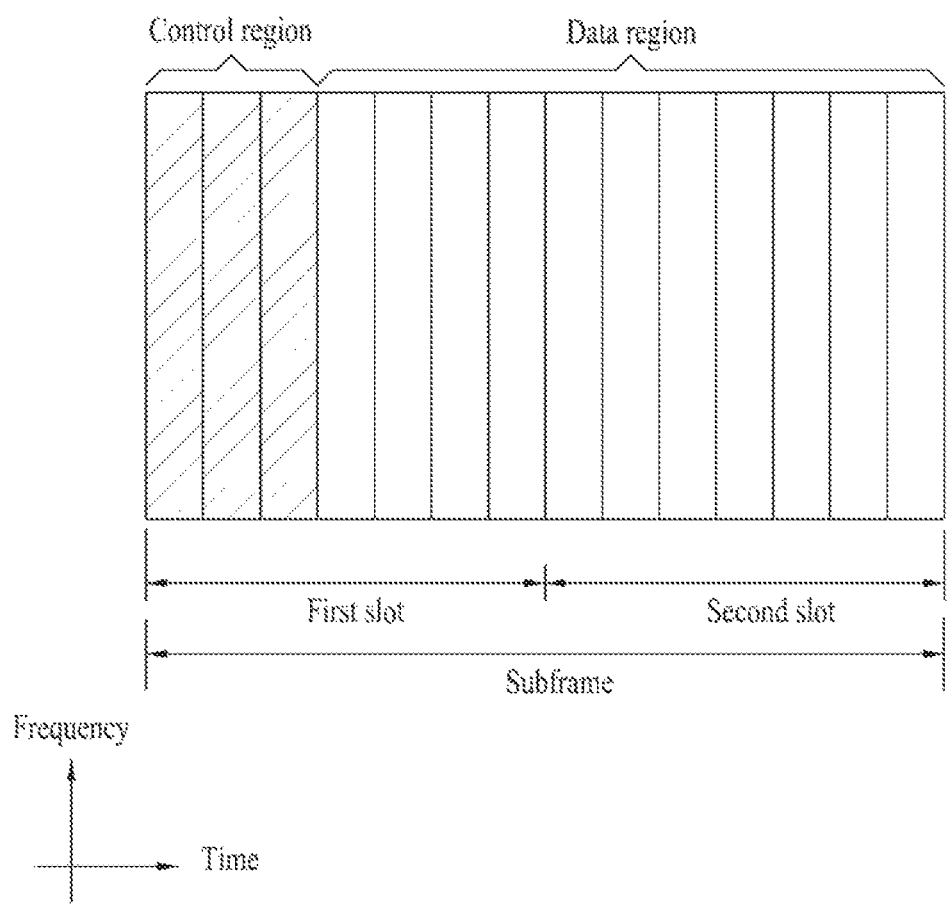
FIG. 3 illustrates the structure of a DL subframe used in a 3GPP (3$^{rd}$ Generation Partnership Project) LTE (Long Term Evolution)/LTE-A (Advanced) system.

FIG. 3 illustrates the structure of a DL subframe used in a 3GPP LTE(-A) system.

A DL subframe is divided into a control region and a data region in a time domain. Referring to FIG. 3, a maximum of 3 (or 4) OFDM symbols located in a front part of a first slot of a subframe correspond to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. For example, the DCI includes transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmit power control commands of individual UEs within a UE group, transmit power control information, and activity information of voice over Internet protocol (VoIP). The size and usage of the DCI carried by one PDCCH are varied depending on DCI formats. The size of the DCI may be varied depending on a coding rate. In the current 3GPP LTE system, various formats are defined, wherein format 0 is defined for UL, and formats 1, 1A, 1B, 1C, 1D, 2, 2A, 3, and 3A are defined for DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DMRS), UL index, channel quality information (CQI) request, DL assignment index, HARQ process number, transmitted precoding matrix indicator (TPMI), precoding matrix indicator (PMI) information is transmitted to the UE as the DCI. Table 3 illustrates an example of the DCI format.

TABLE 3

| DCI format | Description |
| --- | --- |
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact resource assignments for PDSCH using rank-1 closed loop precoding |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 3/3A | Power control commands for PUCCH and PUSCH with 2-bit/1-bit power adjustments |
| 4 | Scheduling of PUSCH in one UL Component Carrier with multi-antenna port transmission mode |

Generally, a DCI format capable of being transmitted to the UE differs according to transmission mode (TM) configured for the UE. In other words, for the UE configured as a specific TM, all DCI formats cannot be used and only predetermined DCI format(s) corresponding to the specific TM can be used.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to 9 REGs and one REG corresponds to 4 REs. In a 3GPP LTE system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. In the 3GPP LTE/LTE-A system, SSs for respective PDCCH formats may have different sizes and a dedicated SS and a common SS are defined. The dedicated SS is a UE-specific SS and is configured for each individual UE. The common SS is configured for a plurality of UEs. Table 4 shows aggregation levels for defining SSs.

TABLE 4

| | Search Space | | Number of PDCCH |
| --- | --- | --- | --- |
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

One PDCCH candidate corresponds to 1, 2, 4, or 8 CCEs according to CCE aggregation levels. An eNB transmits an actual PDCCH (DCI) on a PDCCH candidate in an SS and a UE monitors the SS to detect the PDCCH (DCI). Here, monitoring refers to attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

Meanwhile, in order to reduce BD overhead, fewer DCI formats in number than types of control information transmitted using the PDCCH are defined. A DCI format includes a plurality of different information fields. According to DCI format, types of information fields, the number of information fields, and the number of bits of each information field are different. In addition, the size of control information which matches the DCI format varies according to DCI format. An arbitrary DCI format may be used to transmit control information of two types or more.

Table 5 illustrates an example of control information transmitted in accordance with a DCI format 0. In Table 5, a bit size of each information field is only exemplary, and is not limited as follows.

TABLE 5

| Information Field | bit(s) |
| --- | --- |
| (1) Flag for format 0/format 1A differentiation | 1 |
| (2) Hopping flag | 1 |
| (3) Resource block assignment and hopping resource allocation | $ceil\{log_2(N^{UL}_{RB}(N^{UL}_{RB} + 1)/2)\}$ |
| (4) Modulation and coding scheme and redundancy version | 5 |

TABLE 5-continued

| Information Field | bit(s) |
|---|---|
| (5) New data indicator | 1 |
| (6) TPC command for scheduled PUSCH | 2 |
| (7) Cyclic shift for DMRS | 3 |
| (8) UL index (TDD) | 2 |
| (9) CQI request | 1 |

The flag field is an information field for identifying format 0 from format 1A. In other words, the DCI formats 0 and 1A have the same payload size and are identified from each other by the flag field. A bit size of the resource block assignment and hopping resource allocation field may be varied depending on hopping PUSCH or non-hopping PUSCH. The resource block assignment and hopping resource allocation field for the non-hopping PUSCH provides ceil$\{\log_2(N^{UL}_{RB}(N^{UL}_{RB}+1)/2)\}$ bit(s) for resource allocation of the first slot within the UL subframe, wherein $N^{UL}_{RB}$ is the number of resource blocks included in the UL slot and is dependent on a UL transmission bandwidth set in the cell. Accordingly, the payload size of the DCI format 0 may be varied depending on the UL bandwidth. The DCI format 1A includes an information field for PDSCH allocation, and the payload size of the DCI format 1A may be varied depending on the DL bandwidth. The DCI format 1A provides a reference information bit size for the DCI format 0. Accordingly, if the number of information bits of the DCI format 0 is smaller than the number of information bits of the DCI format 1A, '0' is added to the DCI format 0 until the payload size of the DCI format 0 is the same as that of the DCI format 1A. The added '0' is filled in a padding field of the DCI format.

In the meantime, in order to maintain operation load based on blind decoding at a certain level or less, not all the DCI formats are searched at the same time. For example, the UE is configured semi-statically by upper layer signaling to receive PDSCH data signaled through the PDCCH in accordance with one of transmission modes 1 to 9. Table 6 illustrates a transmission mode for configuring multi-antenna technology and a DCI format where the UE performs blind decoding in accordance with the corresponding transmission mode.

TABLE 6

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
|  | DCI format 2C | UE specific by C-RNTI | Up to 8 layer transmission, ports 7-14 |

In particular, Table 6 illustrates a relation between PDSCH and PDCCH configured by C-RNTI. The UE configured to decode the PDCCH with CRC scrambled in C-RNTI by an upper layer decodes the PDCCH and also decodes the corresponding PDSCH in accordance with each combination defined in Table 6. For example, if the UE is configured in a transmission mode 1 by upper layer signaling, the UE acquires DCI by respectively decoding the PDCCH through the DCI format 1A and 1.

Transmission and reception of the PDCCH will be described in more detail. The eNB generates control information in accordance with the DCI format. The eNB may select one of a plurality of DCI formats (DCI formats 1, 2, ..., N) in accordance with control information to be transmitted to the UE. The eNB attaches cyclic redundancy check (CRC) for error detection to the control information generated in accordance with each DCI format. The CRC is masked with an identifier (for example, radio network temporary identifier (RNTI)) depending on owner or usage of the PDCCH. In other words, the PDCCH is CRC scrambled with the identifier (for example, RNTI). If the C-RNTI is used, the PDCCH carries the control information for the corresponding specific UE. If the other RNTI (for example, P-RNTI, SI-RNTI, RA-RNTI) is used, the PDCCH carries common control information received by all the UEs within the cell. The eNB generates coded data by performing channel coding for CRC added control information. The eNB performs rate matching based on the CCE aggregation level allocated to the DCI format, and generates modulation symbols by modulating the coded data. The modulation symbols constituting one PDCCH may have a CCE aggregation level of one of 1, 2, 4, and 8. The modulation symbols are mapped into physical resource elements (CCE to RE mapping). The UE performs demapping of physical resource elements into CCEs (CCE to RE demapping). Since the UE does not know what CCE aggregation level should be used to receive the PDCCH, the UE performs demodulation for each CCE aggregation level. The UE performs rate dematching for the demodulated data. Since the UE does not know what DCI format (or DCI payload size) of control information should be received therein, the UE performs rate dematching for each of DCI formats (or DCI payload size) of a corresponding transmission mode. The UE performs channel decoding for the rate dematched data in accordance with a code rate, and detects whether an error has occurred, by checking CRC. If an error has not occurred, the UE may be determined that the UE will detect its PDCCH. If the error has occurred, the UE continues to perform blind decoding for the other CCE aggregation level or the other DCI format (or DCI payload size). The UE that has detected its PDCCH removes CRC from the decoded data and acquires control information.

The eNB may transmit data to a UE or UE group in the data region. Data transmitted in the data region is referred to as user data. A PDSCH may be allocated to the data region for user data transmission. The PCH and the DL-SCH are transmitted on the PDSCH. A UE may decode control information received on a PDCCH and thus read data received on the PDSCH. The size and usage of DCI transmitted on one PDCCH may vary according to DCI format and the size of the DCI may vary according to coding rate. Information indicating to which UE or UE group PDSCH data is transmitted and information indicating how the UE or UE group should receive and decode the PDSCH data are transmitted on the PDCCH. For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Figure 4:
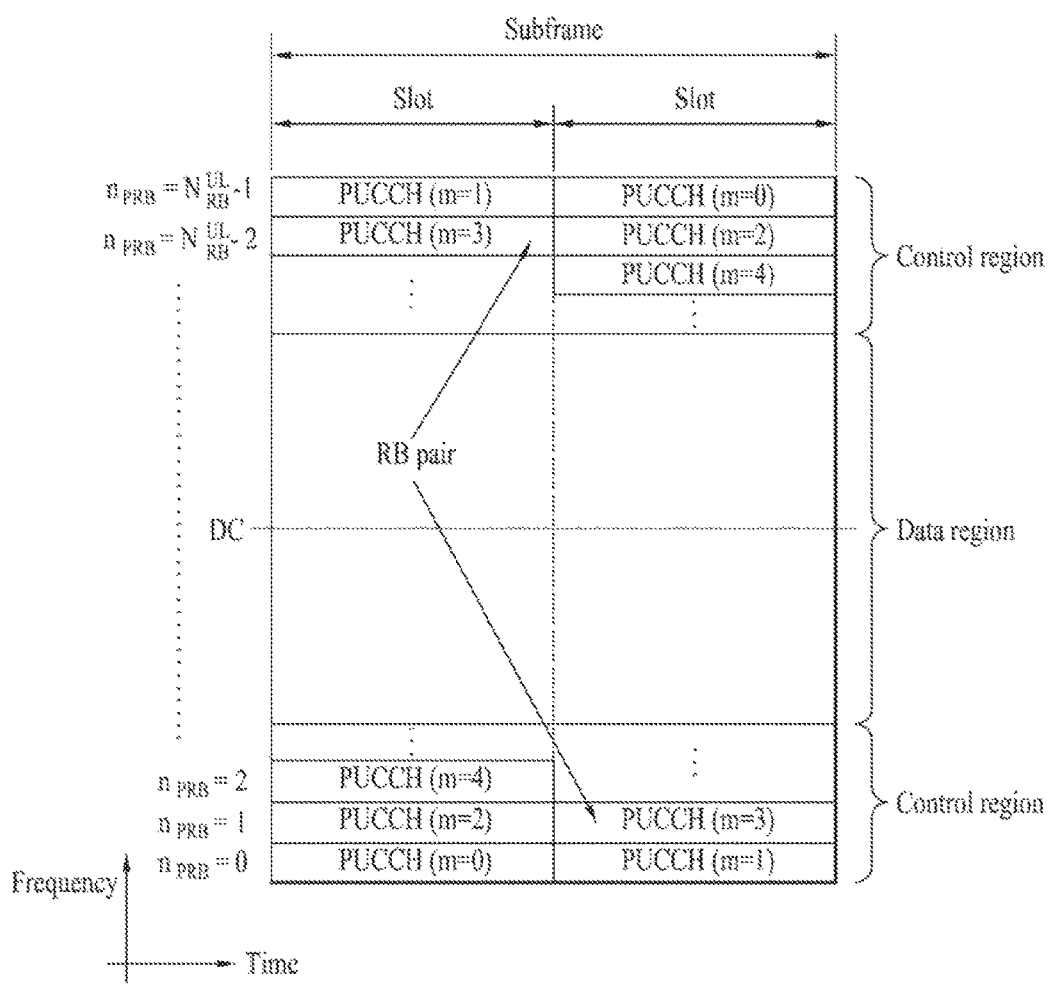
FIG. 4 illustrates the structure of a UL subframe used in a 3GPP LTE/LTE-A system.

FIG. 4 illustrates the structure of a UL subframe used in a 3GPP LTE(-A) system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to deliver user data. The control region and the data region in the UL subframe may also be referred to as a PUCCH region and a PUSCH region, respectively. A sounding reference signal (SRS) may be allocated to the data region. The SRS is transmitted on the last OFDM symbol of the UL subframe in the time domain and is transmitted in a data transmission band, that is, a data region, of the UL subframe in the frequency domain. SRSs of several UEs, which are transmitted/received on the last OFDM symbol of the same subframe, can be distinguished according to a frequency location/sequence.

The DMRS or SRS, associated with PUSCH transmission or PUCCH transmission, is defined by a cyclic shift of a base sequence according to a predetermined rule. For example, an RS sequence $r^{(\alpha)}_{u,v}(n)$ may be defined as $e^{j\alpha n}r_{u,v}(n)$ ($0 \le n \le M^{RS}_{sc}$). Here, $M^{RS}_{sc}$ ($=mN^{RB}_{sc}$) is the length of the RS sequence and $1 \le m \le N^{max,UL}_{RB}$. $N^{max,UL}_{RB}$, an integer multiple of $N^{RB}_{sc}$, denotes the maximum configuration of a UL bandwidth. A plurality of RS sequences may be defined from one base sequence through different cyclic shift values $\alpha$. A plurality of base sequences is defined for the DMRS and SRS. For example, the base sequences may be defined using a root Zadoff-Chu sequence. The base sequences $r_{u,v}(n)$ are divided into base sequence groups, each of which includes one or more base sequences. For example, each base sequence group may include one base sequence ($v=0$) having a length of $M^{RS}_{sc}=mN^{RB}_{sc}$ ($1 \le m \le 5$) and two base sequences each having a length of $M^{RS}_{sc}=mN^{RB}_{sc}$ ($6 \le m \le N^{RB}_{sc}$). In $r_{u,v}(n)$, $u \in \{0, 1, \ldots, 29\}$ is a group number (i.e. a group index) and v denotes a base sequence number (i.e. a base sequence index) in the corresponding group. Each base sequence group number and a base sequence number in the corresponding group may vary with time. A sequence group number u in a slot $n_s$ is defined by a group hopping pattern and a sequence shift pattern. A plurality of different hopping patterns and a plurality of different sequence shift patterns are present. Although a PUCCH and a PUSCH have the same hopping pattern, they may have different sequence shift patterns. The group hopping pattern may be cell-specifically configured using a pseudo-random sequence generator using a cell ID $N^{cell}_{ID}$). The pseudo-random sequence for the group hopping pattern is initialized to a specific initial value (e.g. $c_{init}=\text{floor}(N^{cell}_{ID}/30)$) at the start of each radio frame. The sequence shift pattern $f^{PUCCH}_{ss}$ for the PUCCH may be given based on a cell ID (e.g. $f^{PUCCH}_{ss}=N^{cell}_{ID}$ mod 30) and the sequence shift pattern $f^{PUSCH}_{ss}$ for the PUSCH may be given using a value $\Delta_{ss}$ configured by higher layers (e.g. $f^{PUSCH}_{ss}=(f^{PUCCH}_{ss}+\Delta_{ss})$ mod 30) where $\Delta_{ss} \in \{0, 1, \ldots, 29\}$).

For example, a PUSCH DMRS sequence $r^{(\lambda)}_{PUSCH}$ ($m \cdot M^{RS}_{sc}+n$) associated with a layer $\lambda \in \{0, 1, \ldots, v-1\}$ may be defined as $w^{(\lambda)}(m) \cdot r^{(\alpha\_\lambda)}_{u,v}(n)$. Here, $m=0, 1, n=0, \ldots, M^{RS}_{sc}-1$, and $M^{RS}_{sc}=M^{PUSCH}_{sc}$. $M^{PUSCH}_{sc}$ is a bandwidth scheduled for UL transmission and denotes the number of subcarriers. An orthogonal sequence $w^{(\lambda)}(m)$ may be given by the following Table 7 using a cyclic shift field in the latest UL-related DCI for a transport block associated with corresponding PUSCH transmission. A cyclic shift $\alpha\_\lambda$ in a slot $n_s$ may be given as $2\pi n_{cs,\lambda}/12$. In this case, $n_{cs,\lambda}=(n^{(1)}_{DMRS}+n^{(2)}_{DMRS,\lambda}+n_{PN}(n_s)) \mod 12$ and $n_{PN}(n_s)$ may be given using a pseudo-random sequence c(i). c(i) may be cell-specific and a pseudo-random sequence generator is initialized to a specific initial value (may be cell-specific) at the start of each radio frame. For example, c(i) may be initialized to $c_{init}=\text{floor}(N^{cell}_{ID}/30)\cdot 2^5+f^{PUSCH}_{ss}$. $n^{(1)}_{DMRS}$ may be given by the following Table 8 according to a cyclic shift (cyclic-Shift) parameter configured by higher-layer signaling and $n^{(2)}_{DMRS,\lambda}$ may be given according to the following Table 7 by a cyclic shift for a DMRS field in the latest UL-related DCI for a transport block associated with corresponding PUSCH transmission.

Table 7 illustrates mapping of a cyclic shift field in a UL-related DCI format to $n^{(2)}_{DMRS,\lambda}$ and $[w^{(\lambda)}(0)\ w^{(\lambda)}(1)]$.

TABLE 7

| Cyclic Shift Field in uplink-related DCI | $n_{DMRS,\lambda}^{(2)}$ | | | | $[w^{(\lambda)}(0)\ w^{(\lambda)}(1)]$ | | | |
|---|---|---|---|---|---|---|---|---|
| format [3] | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

Table 8 illustrates mapping of a cyclic shift (cyclicShift) to $n^{(1)}_{DMRS}$ by higher-layer signaling.

TABLE 8

| cyclicShift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

If a UE employs an SC-FDMA scheme in UL transmission, in a 3GPP LTE release-8 or release-9 system, a PUCCH and a PUSCH cannot be simultaneously transmitted on one carrier in order to maintain a single carrier property. In a 3GPP LTE release-10 system, support/non-support of simultaneous transmission of the PUCCH and the PUSCH may be indicated by higher layers.

In the UL subframe, subcarriers distant from a direct current (DC) subcarrier are used as the control region. In other words, subcarriers located at both ends of a UL transmission bandwidth are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarrier.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. MIMO-related feedback information includes a rank indicator (RI) and a precoding matrix indicator (PMI).

The amount of UCI that can be transmitted by a UE in a subframe depends on the number of SC-FDMA symbols available for control information transmission. SC-FDMA symbols available for UCI correspond to SC-FDMA symbols other than SC-FDMA symbols used for reference signal transmission in a subframe. In the case of a subframe in which an SRS is configured, the last SC-FDMA symbol in the subframe is excluded from the SC-FDMA symbols available for UCI. A reference signal is used for coherent PUCCH detection. A PUCCH supports various formats according to transmitted information.

Table 9 shows a mapping relationship between PUCCH formats and UCI in an LTE/LTE-A system.

TABLE 9

| PUCCH format | Modulation scheme | Number of bits per subframe | Usage | Etc. |
|---|---|---|---|---|
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codewords |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 3, PUCCH format 1 series are mainly used to transmit ACK/NACK information, PUCCH format 2 series are mainly used to carry channel state information (CSI) such as channel quality indicator (CQI)/precoding matrix indicator (PMI)/rank indicator (RI), and PUCCH format 3 series and PUCCH format 3 series are mainly used to transmit ACK/NACK information.

A UE is assigned PUCCH resources for UCI transmission by an eNB through higher-layer signaling, dynamic control signaling, or an implicit scheme. Physical resources used for PUCCHs depend on two parameters, $N^{(2)}_{RB}$ and $N^{(1)}_{CS}$, given by higher layers. The parameter $N^{(2)}_{RB}$, which is equal to or greater than 0 ($N^{(2)}_{RB} \geq 0$), indicates available bandwidth for PUCCH format 2/2a/2b transmission at each slot and is expressed as an integer multiple of $N^{RB}_{SC}$. The parameter $N^{(1)}_{CS}$ indicates the number of cyclic shifts used for PUCCH format 1/1a/1b in an RB used for a mixture of format 1/1a/1b and format 2/2a/2b. A value of $N^{(1)}_{CS}$ is an integer multiple of $\Delta^{PUCCH}_{shift}$ within a range of $\{0, 1, \ldots, 7\}$. $\Delta^{PUCCH}_{shift}$ is provided by higher layers. If $N^{(1)}_{CS}$ is 0, no mixed RBs are present. At each slot, at most one RB supports a mixture of PUCCH format 1/1a/1b and PUCCH format 2/2a/2b. Resources used for transmission of PUCCH format 1/1a/1b, PUCCH format 2/2a/2b, and PUCCH format 3 by antenna port p are expressed by $n^{(1,p)}_{PUCCH}$, $n^{(2,p)}_{PUCCH} < N^{(2)}_{RB}N^{RB}_{sc} + ceil(N^{(1)}_{cs}/8) \cdot (N^{RB}_{sc} - N^{(1)}_{cs} - 2)$, and $n^{(2,p)}_{PUCCH}$, respectively, which are indexes of non-negative integer indexes.

More specifically, an orthogonal sequence and/or a cyclic shift to be applied to UCI are determined from PUCCH resource indexes according to a specific rule predefined for each PUCCH format, and resource indexes of two RBs in a subframe, to which a PUCCH is to be mapped, are provided. For example, a PRB for PUCCH transmission in a slot $n_s$ is given as follows.

$$n_{PRB} = \begin{cases} \lfloor \frac{m}{2} \rfloor & \text{if } (m+n_s \text{ mod 2})\text{mod 2} = 0 \\ N^{UL}_{RB} - 1 - \lfloor \frac{m}{2} \rfloor & \text{if } (m+n_s \text{ mod 2})\text{mod 2} = 1 \end{cases} \quad \text{[Equation 1]}$$

In Equation 1, m depends on a PUCCH format and is given as Equation 2, Equation 3, and Equation 4 for PUCCH format 1/1a/1b, PUCCH format 2/2a/2b, and PUCCH format 3, respectively.

$$m = \begin{cases} N^{(2)}_{RB} & \text{if } n^{(1,\tilde{p})}_{PUCCH} < c \cdot N^{(1)}_{cs}/\Delta^{PUCCH}_{shift} \\ \lfloor \frac{n^{(1,\tilde{p})}_{PUCCH} - c \cdot N^{(1)}_{cs}/\Delta^{PUCCH}_{shift}}{c \cdot N^{RB}_{sc}/\Delta^{PUCCH}_{shift}} \rfloor + N^{(2)}_{RB} + \lceil \frac{N^{(1)}_{cs}}{8} \rceil & \text{otherwise} \end{cases} \quad \text{[Equation 2]}$$

$$c = \begin{cases} 3 & \text{normal cyclic prefix} \\ 2 & \text{extended cyclic prefix} \end{cases}$$

In Equation 2, $n^{(1,p)}_{PUCCH}$ denotes a PUCCH resource index of an antenna port p for PUCCH format 1/1a/1b. In the case of an ACK/NACK PUCCH, $n^{(1,p)}_{PUCCH}$ is a value implicitly determined by the first CCE index of a PDCCH carrying scheduling information of a corresponding PDSCH.

$$m = \lfloor n^{(2,\tilde{p})}_{PUCCH} / N^{RB}_{sc} \rfloor \quad \text{[Equation 3]}$$

where $n^{(2)}_{PUCCH}$ denotes a PUCCH resource index of an antenna port p for PUCCH format 2/2a/2b and is a value transmitted to a UE from an eNB through higher-layer signaling.

$$m = \lfloor n^{(3,\tilde{p})}_{PUCCH} / N^{PUCCH}_{SF,0} \rfloor \quad \text{[Equation 4]}$$

$n^{(3)}_{PUCCH}$ denotes a PUCCH resource index of an antenna port p for PUCCH format 3 and is a value transmitted to a UE from an eNB through higher-layer signaling. $N^{PUCCH}_{SF,0}$ indicates a spreading factor for the first slot of a subframe. For all of two slots of a subframe using normal PUCCH format 3, $N^{PUCCH}_{SF,0}$ is 5. For first and second slots of a subframe using a reduced PUCCH format 3, $N^{PUCCH}_{SF,0}$ is 5 and 4, respectively.

Figure 5:
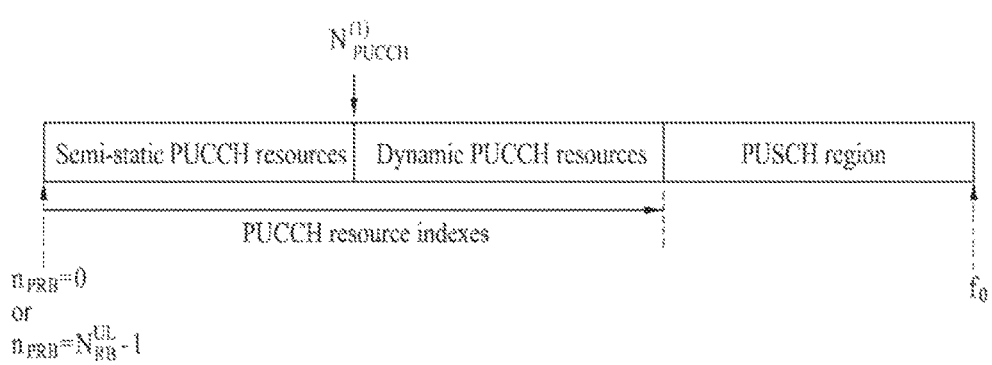
FIG. 5 illustrates logical arrangement of physical uplink control channel (PUCCH) resources used in one cell.

FIG. 5 illustrates logical arrangement of PUCCH resources used in one cell.

PUCCH resources are configured based on a cell ID. A UE acquires an ID of a cell accessed thereby and configures PUCCH resources for PUCCH transmission in the cell, that is, PUCCH transmission to a node of the cell, based on the cell ID. The PUCCH resources configured based on one cell ID include PUCCH resources for transmission of CSI, PUCCH resources for transmission of semi-persistent scheduling (SPS) ACK/NACK and SR, and PUCCH resources for transmission of dynamic ACK/NACK (i.e. dynamically allocated PUCCH resources linked with a PDCCH). In a 3GPP LTE/LTE-A system, PUCCH resources for transmission of CSI, SPS ACK/NACK, SR, etc. are semi-statically reserved explicitly for the UE by a higher-layer signal. Hereinafter, for ACK/NACK transmission, a PUCCH resource dynamically determined in association with a PDCCH is especially referred to as a dynamic PUCCH resource or an implicit PUCCH resource, and a PUCCH resource explicitly configured by a higher-layer signal is referred to as a semi-static PUCCH resource or an explicit PUCCH resource. In addition, a PUCCH resource for CSI transmission is referred to as a CSI PUCCH resource or a CSI resource, a PUCCH resource for SPS ACK/NACK transmission is referred to as an SPS ACK/NACK PUCCH resource or an SPS ACK/NACK resource, a PUCCH resource for SR transmission is referred to as an SR PUCCH resource or an SR resource, and a PUCCH resource for ACK/NACK transmission associated with a PDCCH is referred to as an ACK/NACK PUCCH resource or an ACK/NACK resource.

Referring to FIG. 5, PUCCH resources based on one cell ID are arranged in order of CSI PUCCH resources, SPS ACK/NACK and SR PUCCH resources, and dynamic ACK/NACK PUCCH resources in the direction of a DC subcarrier (i.e. a subcarrier mapped to $f_o$ in a frequency up-conversion procedure) from subcarriers distant from the DC subcarrier. In other words, semi-statically configured PUCCH resources through higher-layer signaling are located at an outer side of UL transmission bandwidth and dynamically configured ACK/NACK PUCCH resources are located nearer a center frequency than the semi-statically configured PUCCH resources. In this case, as a PUCCH resource approaches the center frequency, a PUCCH resource index increases. Namely, the index of a PUCCH resource allocated to a PRB near the center frequency is larger than the index of a PUCCH resource allocated to a PRB distant from the center frequency. A plurality of PUCCH resources in the same PRB is indexed based on an orthogonal sequence and/or a cyclic shift.

Referring to Equation 2, PUCCH resources for ACK/NACK are not pre-allocated to each UE and a plurality of UEs in a cell dividedly uses a plurality of PUCCH resources at each time point. Specifically, PUCCH resources used by the UE to carry ACK/NACK are dynamically determined based on a PDCCH carrying scheduling information for a PDSCH carrying corresponding DL data. An entire region in which the PDCCH is transmitted in each DL subframe includes a plurality of CCEs and the PDCCH transmitted to the UE is composed of one or more CCEs. The UE transmits ACK/NACK through a PUCCH resource linked to a specific CCE (e.g. first CCE) among the CCEs constituting the PDCCH received thereby.

In each UE, an ACK/NACK signal is transmitted on different resources including different CSs (frequency domain codes) of a computer-generated constant amplitude zero autocorrelation (CG-CAZAC) sequence and OCs (time domain spread codes). An OC includes, for example, a Walsh/discrete Fourier transform (DFT) OC. An orthogonal sequence (e.g. [$w_0, w_1, w_2, w_3$]) may be applied in either an arbitrary time domain (after fast Fourier transform (FFT) modulation) or an arbitrary frequency domain (before FFT modulation). If the number of CSs is 6 and the number of OCs is 3, a total of 18 UEs may be multiplexed in the same physical resource block (PRB) based on a single antenna port. In other words, PUCCH resources used for transmission of an ACK/NACK signal may be distinguished by an OCC, a CS (or a CAZAC CS (CCS)), and a PRB. If any one of the OCC, CS, and PRB of PUCCH resources differs, the PUCCH resources may be different resources.

Figure 6:
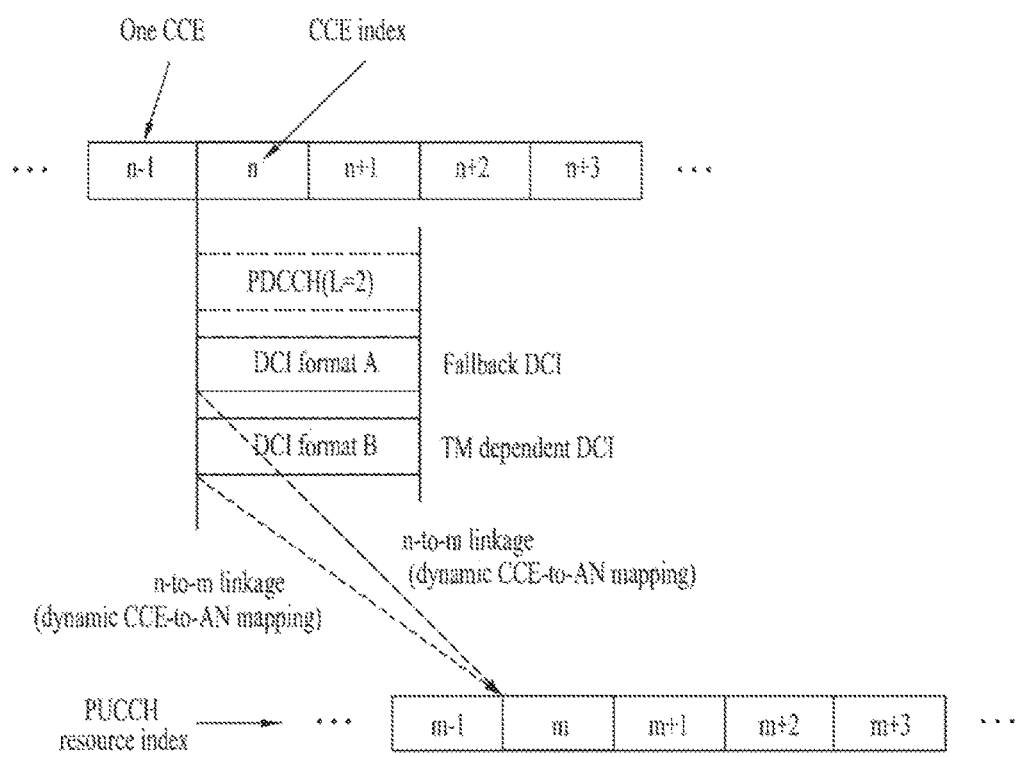
FIG. 6 illustrates an example of determining a dynamic PUCCH resource in a 3GPP LTE-(A) system.

FIG. 6 illustrates an example of determining a dynamic PUCCH resource in a 3GPP LTE/LTE-A system.

Referring to FIG. 6, each PUCCH resource index corresponds to a dynamic PUCCH resource for ACK/NACK. According to channel state, an eNB transmits DCI (or fallback DCI) according to TM configured for the UE to the UE on a PDCCH. The fallback DCI refers to DCI to be used for communication according to another TM having lower communication efficiency (hereinafter, fallback mode) than the corresponding TM, in preparation for the case in which it is difficult to perform communication according to TM due to a poor channel state. Hereinafter, DCI according to TM will be referred to as TM dependent DCI and DCI for a fallback mode will be referred to as fallback DCI. In addition, a DCI format defined for transmission of the TM dependent DCI will be referred to as a TM dependent DCI format and a DCI format defined for transmission of the fallback DCI will be referred to as a fallback DCI format. Referring to Table 6, for example, DCI format 1A may correspond to the fallback DCI format. Upon detecting the fallback DCI, the UE may switch to the fallback mode and operate in the fallback mode. Alternatively, when RRC reconfiguration should be performed, the UE may switch to the fallback mode and operate in the fallback mode in order to eliminate ambiguity generated while RRC reconfiguration is performed.

Referring to FIG. 6, an eNB may transmit scheduling information for a PDSCH to a UE through a PDCCH of an aggregation level 2 (L=2) on CCEs n and n+1. The UE is configured as a specific TM through higher-layer signaling. Therefore, a DCI format which can be transmitted to the UE is limited to a fallback DCI format (DCI format A in FIG. 6) and a TM dependent DCI format (DCI format B of FIG. 6) according to TM configured for the UE. The UE attempts to decode a PDCCH candidate(s) according to the aggregation level depending on DCI format A and DCI format B in a common SS and/or a UE-specific SS, demodulates a PDSCH using a detected DCI format, and transmits ACK/NACK for the PDSCH to the eNB using a PUCCH resource linked to a CCE of a PDCCH on which the DCI format is detected. In this case, since DCI format A and DCI format B are transmitted on the same CCE resources, they are linked to the same PUCCH resource m. Accordingly, the UE transmits ACK/NACK associated with corresponding DCI to the eNB using the PUCCH resource m in both cases in which DCI of DCI format A is detected and DCI of DCI format B is detected and the eNB receives ACK/NACK associated with the corresponding DCI from the UE using the PUCCH resource m in both cases in which the DCI of DCI format A is transmitted and the DCI of DCI format B is transmitted.

Specifically, in the 3GPP LTE/LTE-A system, PUCCH resource indexes for transmission by two antenna ports ($p_0$ and $p_1$) are determined as follows.

$$n_{PUCCH}^{(1,\tilde{p}=p0)} = n_{CCE} + N_{PUCCH}^{(1)} \quad \text{[Equation 5]}$$

$$n_{PUCCH}^{(1,\tilde{p}=p1)} = n_{CCE} + 1 + N_{PUCCH}^{(1)} \quad \text{[Equation 6]}$$

Here, $n^{(1,\tilde{p}=p0)}_{PUCCH}$ denotes a PUCCH resource index (i.e. number) to be used by the antenna port $p_0$, $n^{(1,\tilde{p}=p1)}_{PUCCH}$ denotes a PUCCH resource index to be used by the antenna port $p_1$, and $N^{(1)}_{PUCCH}$ denotes a value signaled from a higher layer. $N^{(1)}_{PUCCH}$ corresponds to a location at which a dynamic PUCCH resource is stated among PUCCH resources of a cell. $n_{CCE}$ corresponds to the smallest value among CCE indexes used for PDCCH transmission. For example, when a CCE aggregation level is 2 or more, the first CCE index among a plurality of CCE indexes aggregated for PDCCH transmission is used to determine an ACK/NACK PUCCH resource. That is, a PUCCH resource used to transmit ACK/NACK for a PDCCH or a PDSCH according to the PDCCH is determined in association with a DL CCE and this is called a dynamic CCE-to-AN linkage.

According to a 3GPP LTE/LTE-A system up to now, all UEs serviced in a specific cell semi-statically receive information indicating the same $N^{(1)}_{PUCCH}$ from an eNB of the cell. In other words, according to a legacy 3GPP LTE/LTE-A system, UEs located in a specific cell share dynamic PUCCH resources after $N^{(1)}_{PUCCH}$ and the dynamic PUCCH resources are linked to CCE indexes commonly applied to the specific cell, respectively. If a cell in which the UE receives a DL signal is the same as a cell in which the UE transmits a UL signal, the UE may determine the dynamic PUCCH resources without any problem using only a cell-specifically provided $N^{(1)}_{PUCCH}$. However, in CoMP in which a cell (DL cell) in which the UE receives a DL signal may be different from a cell (UL cell) in which the UE transmits a UL signal, PUCCH resources configured per cell may differ. Hereinafter, a node of the DL cell will be referred to as a TX point and a node of the UL cell will be referred to as an RX point. When the TX point is different from the RX point, an index of a PUCCH resource linked to a CCE of a PDCCH received in the DL cell may become a different index in the UL cell and the PUCCH resource may be linked to a CCE of a different PDCCH in the UL cell. Moreover, since semi-static PUCCH resources are independently reserved per cell, a start location of a dynamic PUCCH resource of the DL cell may differ from a start location of a dynamic PUCCH resource of the UL cell. In this case, a PUCCH resource linked to a specific CCE cannot be determined using only one $N^{(1)}_{PUCCH}$. Accordingly, the present invention provides a method for efficiently using a PUCCH resource in a CoMP situation in which the DL cell and UL cell may be different.

The present invention proposes configuring additional dynamic PUCCH resources separately from conventional dynamic PUCCH resources. In other words, the present invention proposes UE-specifically, UE group-specifically, or TM-specifically configuring a set of additional dynamic PUCCH resources separately from a set of cell-specifically configured conventional dynamic PUCCH resources. For example, an eNB may configure the additional dynamic PUCCH resources by transmitting a UE-specific, UE group-specific, or TM-specific PUCCH resource index offset value to a UE separately from a cell-specifically provided PUCCH resource index offset value (e.g. $N^{(1)}_{PUCCH}$).

Figure 7:
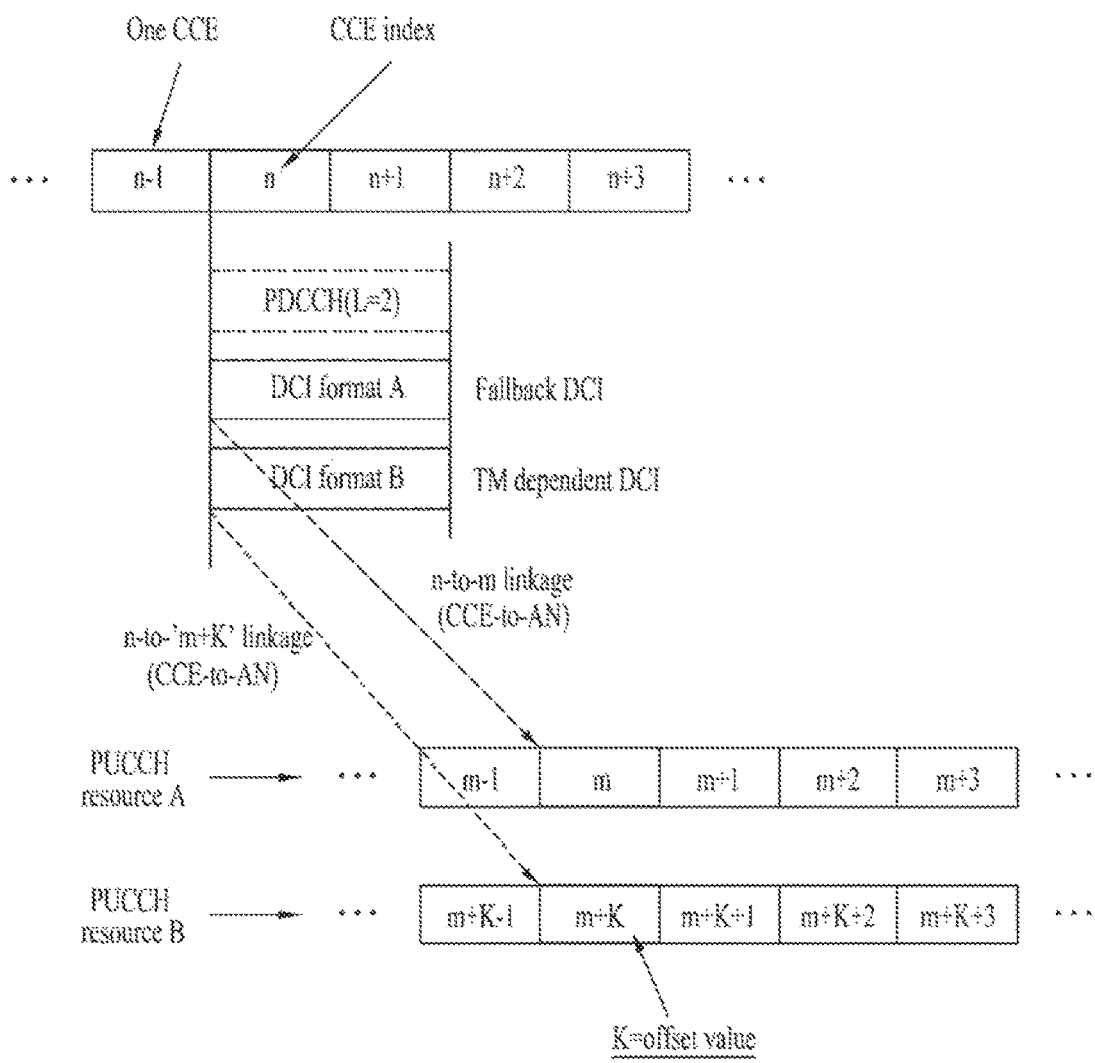
FIG. 7 illustrates an example of determining a dynamic PUCCH resource according to an embodiment of the present invention.
Figure 8:
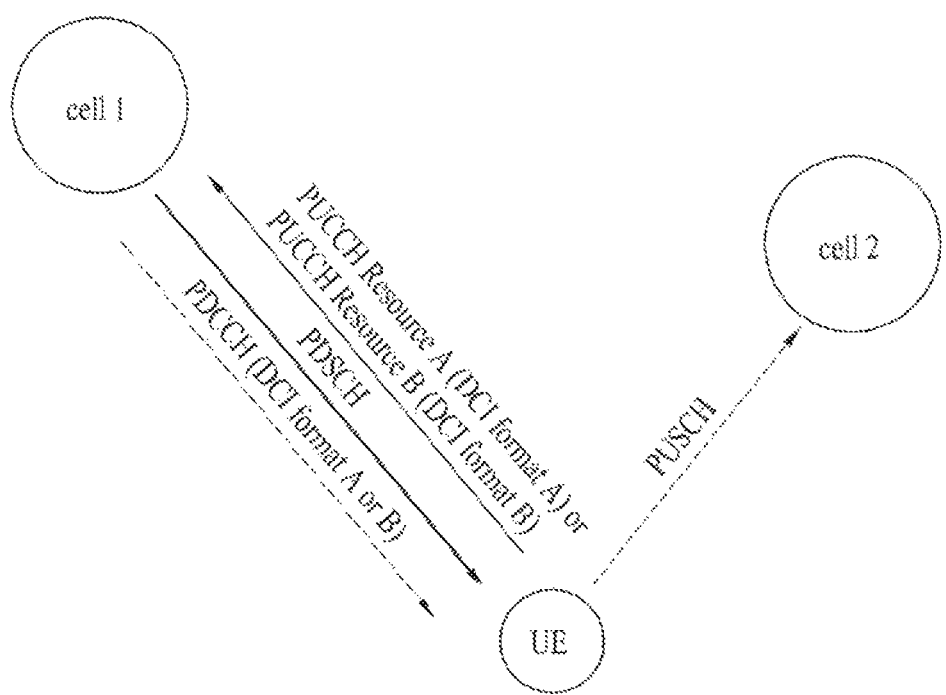
FIG. 8 illustrates an example of CoMP (coordinated multi-point transmission/reception) to which the present invention is applicable.

FIG. 7 illustrates an example of determining a dynamic PUCCH resource according to an embodiment of the present invention and FIG. 8 illustrates an example of CoMP to which the present invention is applicable.

For example, the eNB may configure additional dynamic PUCCH resources by transmitting a UE-specific, UE group-specific, or TM-specific PUCCH resource index offset value K to the UE, separately from a PUCCH resource index offset value (e.g. $N^{(1)}_{PUCCH}$) cell-specifically provided for cell 1.

The UE configured to perform CoMP attempts to decode DCI according to each of a TM dependent DCI format and a fallback DCI format in an associated SS, by a higher-layer signal transmitted by the eNB. In FIG. 7 and FIG. 8, DCI format B, which is the TM dependent DCI format, corresponds to a DCI format defined for CoMP. The UE transmits ACK/NACK for TM dependent DCI or ACK/NACK for a PDSCH according to the TM dependent DCI to the eNB, using a PUCCH resource linked to a CCE index (e.g. CCE n) of a PDCCH carrying the TM dependent DCI (DCI format B) or fallback DCI (DCI format A). According to the present invention, upon detecting the TM dependent DCI corresponding to CoMP, the UE determines a PUCCH resource linked to the CCE index n of the PDCCH carrying the TM dependent DCI among dynamic PUCCH resources separately configured from conventional dynamic PUCCH resources. For example, referring to FIG. 7, upon detecting the TM dependent DCI, the UE transmits corresponding ACK/NACK to the eNB using a PUCCH resource 'm+K' linked to the CCE index n among PUCCH resources B which are a set of PUCCH resources separately configured for CoMP. Meanwhile, when the UE should switch to a fallback mode, the UE determines a PUCCH resource linked to the CCE index n of the PDCCH carrying the fallback DCI among PUCCH resources A which are a set of the conventional dynamic PUCCH resources. For example, the UE transmits corresponding ACK/NACK to the eNB using a PUCCH resource m linked to the CCE index n among the PUCCH resources B. In other words, the UE may receive a plurality of PUCCH resource index offset values from the eNB and determine a PUCCH resource by applying a different offset value according to whether the fallback DCI is detected or the TM dependent DCI is detected. Referring to FIG. 7, the UE operating in the fallback mode determines a dynamic PUCCH resource by configuring a PUCCH resource index offset as $N^{(1)}_{PUCCH}$ and the UE operating in the CoMP mode determines a dynamic PUCCH resource by configuring the PUCCH resource index offset as '$N^{(1)}_{PUCCH}+K$'.

In the illustrated example of FIG. 7, a value indicating a relative location based on $N^{(1)}_{PUCCH}$ indicating the start location of the conventional dynamic PUCCH resource among PUCCH resources of a corresponding cell is used as an offset value indicating the start location of the additionally configured dynamic PUCCH resource according to the present invention. However, instead of the relative value based on $N^{(1)}_{PUCCH}$, a value indicating an absolute start location may be used as the offset value indicating the start location of the additionally configured dynamic PUCCH resource according to the present invention.

Referring to FIG. 8, the UE may transmit UCI linked to a PDCCH to cell 1, which is the same as cell 1 in which the PDCCH is received, using a PUCCH resource determined according to the above-described embodiment of the present invention.

The above-described embodiment of the present invention may be applied not only to a DCI format for PDSCH transmission, i.e. a DCI format for a DL grant, but also to a DCI format for a UL grant. Referring to FIG. 8, the UE of the present invention may transmit ACK/NACK information about the DCI format for the DL grant to cell 1 using a PUCCH resource determined according to the above-described embodiment of the present invention. Notably, the UE may transmit a PUSCH according to the DCI format for the DL grant to cell 2 different from cell 1.

In addition to the PUCCH resource index, ACK/NACK transmission related parameters including a PUCCH/PUSCH DMRS sequence, power control setting, a PUCCH payload sequence, and a hopping pattern may vary with the detected DCI format. In other words, the eNB may configure the ACK/NACK transmission related parameters including the PUCCH/PUSCH DMRS sequence, power control setting, PUCCH payload sequence, and hopping pattern as parameters for the TM dependent DCI format separately from parameters for the fallback DCI format and transmit the configured parameters to the UE. Upon detecting the fallback DCI format, the UE may transmit a PUCCH by applying the parameters for the fallback DCI and, upon detecting the TM dependent DCI format, the UE may transmit the PUCCH by applying the parameters for the TM dependent DCI. For example, the eNB may separately configure DMRS sequences, power control parameters, etc. with respect to a DCI format (e.g. DCI format 0) for fallback PUSCH transmission and a DCI format (e.g. DCI format 4) for TM dependent PUSCH transmission (for MIMO transmission) and may signal the separately configured sequences, parameters, etc. to the UE. The UE may perform PUSCH transmission by applying a DMRS sequence, a power control parameter, etc. corresponding to a detected DCI format among the pre-configured DMRS sequences, power control parameters, etc.

The embodiment of the present invention may be applied to carrier aggregation. Carrier aggregation (CA) (or bandwidth aggregation) refers to a technology that uses a wider UL/DL bandwidth by aggregating a plurality of UL/DL frequency blocks in order to use a wider frequency bandwidth than a frequency bandwidth operating on one carrier. A general wireless communication system transmits/receives data through one DL band and through one UL band corresponding to the DL band (in the case of frequency division duplex (FDD) mode) or transmits/receives data through a UL/DL time unit (in the case of time division duplex (TDD) mode) by dividing a prescribed radio frame into the UL time unit and the DL time unit in the time domain. An eNB and a UE transmit and receive data and/or control information scheduled on a prescribed time unit basis, i.e. on a subframe basis. In this way, CA is a technology that uses a wider UL/DL bandwidth by aggregating a plurality of UL/DL frequency blocks in order to use a wider frequency bandwidth, whereas a single carrier technology uses one DL band and one UL band corresponding to the DL band for communication. The CA technology is different from OFDM technology for performing DL or UL communication by carrying a base frequency band, divided into a plurality of orthogonal subcarriers, on one carrier frequency, in that DL and/or UL communication is performed using a plurality of carrier frequencies. Each of plural aggregated carriers is referred to as a component carrier (CC). CCs may be contiguous or non-contiguous in the frequency domain and the bandwidth of each CC may be independently determined. Asymmetrical CA in which the number of UL CCs is different from the number of DL CCs may be configured. Here, a UL CC and a DL CC may also be referred to as UL resources and DL resources, respectively.

A 3GPP LTE-A system uses the concept of a cell to manage radio resources. A cell is defined as a combination of DL resources and UL resources, that is, as a combination of a DL CC and a UL CC. A cell may be configured with DL resources alone or with a combination of DL resources and UL resources. When CA is supported, a linkage between a carrier frequency of DL resources (or DL CC) and a carrier frequency of UL resources (or UL CC) may be indicated by system information. For example, a combination of DL resources and UL resources may be indicated by a system information block type 2 (SIB2) linkage. In FDD, since a UL operating bandwidth and a DL operating bandwidth differ, different carrier frequencies are linked to constitute one cell and the SIB2 linkage indicates a frequency different from a DL CC accessed by the UE as a frequency of a UL CC. In other words, in FDD, a DL CC constituting one cell and a UL CC linked to the DL CC operate in different frequencies. In TDD, since a UL operating bandwidth is the same as a DL operating bandwidth, one carrier frequency constitutes one cell and the SIB2 linkage indicates a frequency identical to a DL CC accessed by the UE as a frequency of a corresponding UL CC. In other words, in TDD, a DL CC constituting one cell and a UL CC linked to the DL CC operate in the same frequency. Here, the carrier frequency refers to a center frequency of each cell or CC. A cell that operates on a primary frequency may be referred to as a primary cell (PCell) or PCC and a cell that operates on a secondary frequency (or SCC) may be referred to as a secondary cell (SCell) or SCC. The PCell refers to a cell used for the UE to perform an initial connection establishment or connection re-establishment procedure. The PCell may refer to a cell indicated during a handover procedure. As another example, the PCell may refer to a DL CC on which the UE acquires initial synchronization by receiving a DL synchronization signal (SS) and a UL CC linked to the DL CC. In DL, a carrier corresponding to the PCell is called a DL primary CC (DL PCC) and, in UL, a carrier corresponding to the PCell is called a UL primary CC (UL PCC). The SCell refers to a cell that is configurable after radio resource control (RRC) connection establishment is performed and is usable to provide additional radio resources. According to capabilities of the UE, the SCell may form a set of serving cells for the UE together with the PCell. A serving cell may be called a serving CC. A carrier corresponding to the SCell in DL is referred to as a DL secondary CC (DL SCC) and a carrier corresponding to the Scell in UL is referred to as a UL secondary CC (UL SCC). For a UE that is in an RRC_CONNECTED state, for which CA is not configured or CA is not supported, only one serving cell comprised of only the PCell is present. In contrast, for a UE in an RRC_CONNECTED state, for which CA is configured, one or more serving cells may be present and all serving cells may include one PCell and one or more SCells. For CA, a network may configure a UE that supports CA by adding one or more SCells to a PCell initially configured in the connection establishment procedure after an initial security activation procedure is initiated. However, even if the UE supports CA, the network may configure only the PCell for the UE, without adding the SCells.

For reference, the term cell used in CA is different from the term cell indicating a predetermined geographical area to which a communication service is provided by one eNB or one antenna group. A DL signal of a specific cell referring to coverage of a communication service indicates a signal that an eNB or antenna group of the specific cell transmits to a UE and a UL signal of the specific cell indicates a signal that the UE transmits to the eNB or antenna group of the specific cell. In contrast, a DL/UL signal of a cell of CA indicates a radio signal transmitted/received using resources constituting the corresponding cell. To distinguish a cell indicating a predetermined geographical area from a cell of CA, embodiments of the present invention will be described hereinbelow by referring to the cell of CA as a CC and the cell of the geographical area as a cell.

In the case of communication using a single carrier, only one serving CC is present and thus a PDCCH carrying a UL/DL grant and a PUSCH/PDSCH corresponding to the PDCCH are transmitted in the same CC. In other words, in the case of FDD in a single-carrier situation, a PDCCH for a DL grant with respect to a PDSCH to be transmitted on a specific DL CC is transmitted on the specific CC and a PDCCH for a UL grant with respect to a PUSCH to be transmitted on a specific UL CC is transmitted on a DL CC linked to the specific UL CC. In contrast, in a multi-carrier system, since a plurality of serving cells may be configured, transmission of the UL/DL grant on a serving cell having a good channel state may be permitted. Thus, if a CC on which the UL/DL grant, which is scheduling information, is carried is different from a CC on which UL/DL transmission corresponding to the UL/DL grant is performed, this is called cross-carrier scheduling (CCS). Hereinafter, a CC on which a PDCCH carrying a UL/DL grant is transmitted will be referred to as a scheduling CC and a CC on which a PUSCH/PDSCH according to the UL/DL grant is transmitted will be referred to as a scheduled CC. If any CC is used to transmit a PDCCH carrying scheduling information thereof, the CC is both a scheduling CC and a scheduled CC. A 3GPP LTE-A system may support an aggregate of plural CCs and support a CCS operation based on the aggregated CCs in order to improve data transmission rate and perform stable control signaling. A PCC may carry scheduling information therefor and scheduling information for an SCC and the SCC may carry scheduling information therefor and scheduling information for another SCC. Notably, the SCC basically cannot carry scheduling information for the PCC. Although a plurality of PDCCHs may be transmitted through a scheduling CC, transmission of a PUCCH associated with the PDCCHs is performed only on the PCC. Accordingly, a PUCCH resource associated with the PCC and a PUCCH resource associated with the SCC are reserved on the PCC.

If PUCCH transmission is permitted only on the PCC, since UCI may be transmitted only on the PCC in both CCS and non-CCS, PCC related PUCCH resources and SCC related PUCCH resources are reserved on the PCC. For example, in CCS, assuming that the PCC is a scheduling CC of an SCC(s), a PUCCH resource(s) for a PDSCH(s) transmitted through the PCC according to a PDCCH transmitted through the PCC and a PUCCH resource(s) for a PDSCH(s) transmitted through the SCC(s) according to the PDCCH transmitted through the PCC are implicitly reserved by CCE indexes of the PDCCHs on the PCC. In non-CCS in which scheduling information of a CC is transmitted only through the corresponding CC, a PUCCH resource(s) associated with a PDCCH(s) transmitted through the PCC are implicitly reserved by a CCE index(es) of the PDCCH(s) and a PUCCH resource(s) associated with a PDCCH(s) transmitted through the SCC are reserved by explicit signaling from an eNB. For example, the eNB semi-statically provides PUCCH resource indexes for the SCC to the UE through higher-layer signaling and the UE may dynamically indicate a PUCCH resource index to be used for actual ACK/NACK transmission using a predetermined field in a DCI format. For example, a TPC field in the DCI format may be used as an ACK/NACK resource indicator (ARI) indicating one of a predetermined number of explicitly configured PUCCH resources.

Both in CA of CCS and in CA of non-CCS, a CoMP operation may be performed. The present invention proposes further explicitly or implicitly reserving a PUCCH resource for CoMP, separately from a conventional PUCCH resource reserved for a PCC and an SCC on the PCC, when CA and CoMP are configured together. When CoMP is performed on a plurality of carrier aggregated CCs, the eNB may transmit CoMP PUCCH resource location information (e.g. information indicating a PUCCH resource start location) per CC to the UE, so that a PUCCH resource region (also referred to as a PUCCH resource set or a PUCCH resource group) for CoMP per CC may be separately configured. For example, when CoMP is applied to N CCs, the eNB may signal N PUCCH resource index offset values to the UE. Upon detecting a fallback DCI format, the UE may determine a PUCCH resource among conventional PUCCH resources and upon detecting TM dependent DCI, the UE may determine a PUCCH resource to be used for UCI transmission associated with a CC among new PUCCH resources reserved separately for the CC based on the CoMP PUCCH resource location information per CC.

Assuming that a fallback DCI format is referred to as DCI format 1A, a TM dependent DCI format is referred to as DCI format X, a DCI format detected on a PCC is referred to as PCC DCI format, and a DCI format detected on an SCC is referred to as SCC DCI format, in the case of CA of CCS, a PUCCH resource may be reserved/determined on the PCC as follows. In this case, a PCC PUCCH resource refers to a PUCCH resource on a PCC.

PCC DCI format 1A→conventional PCC PUCCH resource: CCE linkage

PCC DCI format X→new PCC PUCCH resource: offset signaling and CCE linkage

SCC DCI format 1A→conventional PCC PUCCH resource: CCE linkage

SCC DCI format X→new PCC PUCCH resource: offset signaling and CCE linkage

For reference, simultaneous transmission of a PUSCH and a PUCCH is not permitted and, upon collision of a PUSCH transmission timing and a PUCCH transmission timing (i.e. PUSCH transmission and PUCCH transmission are simultaneously configured), UCI may be piggybacked on the PUSCH and then transmitted. In other words, when the PUSCH transmission timing and PUCCH transmission timing collide in a UE configured not to permit simultaneous transmission of the PUSCH and the PUCCH, the UE drops PUCCH transmission, multiplexes UL data and UCI to the PUSCH, and transmits the multiplexed data and UCI.

In CA of non-CCS, a PUCCH resource for an SCC may be explicitly configured by higher-layer (e.g. RRC) signaling. However, as in the CCS, only a PUCCH resource region for CoMP may be signaled using a PUCCH resource index offset and an actual individual PUCCH resource may be dynamically allocated. That is, separately from a dynamic PUCCH resource region of a PCC, a dynamic PUCCH resource for CoMP for an SCC may be occupied and configured on the PCC. Individual mapping between a PDCCH through an SCC and a PUCCH resource reserved on the PCC for CoMP of the SCC may be performed based on a CCE index of a CoMP dependent DCI format carried by the PDCCH.

In PUCCH format 3, although PUCCH resource allocation to a CoMP UE operating in a CoMP mode and a normal UE operating in a non-CoMP mode may be performed according to the above-described embodiment of the present invention, PUCCH resource allocation may be performed by segmenting a PUCCH resource set pre-reserved for PUCCH format 3. For example, while the normal UE performs transmission of PUCCH format 3 by selecting one PUCCH resource from among PUCCH resources in a pre-reserved PUCCH resource set, the CoMP UE may use one or more PUCCH resources unused by the normal UE among the PUCCH resources in the PUCCH resource set. If four PUCCH resources are reserved for PUCCH format 3 by RRC signaling, two of the four PUCCH resources are used for PUCCH resources for conventional PUCCH transmission and the other two may be used for PUCCH resources for new transmission (e.g. CoMP). Alternatively, as another example, a plurality of PUCCH resource sets each having four PUCCH resources may be configured, wherein a specific set is used for PUCCH resources for conventional transmission and the other resource sets are used for PUCCH resources for newly defined transmission. In this case, how to distinguish between the plural PUCCH resource sets or which PUCCH resource set is to actually used may be implicitly or explicitly determined according to DCI format, a CCE index, an antenna port, an aggregation level, RRC signaling, and the like. Currently, an ARI is composed of two bits (i.e. four states) to indicate one of four PUCCH resources. The ARI may be used to indicate a normal PUCCH resource or a new PUCCH resource according to DCI format. For example, when the UE receives configuration for a PUCCH resource set 1 of {A, B, C, D} for a normal TM and a PUCCH resource set 2 of {A', B', C', D'} for a CoMP mode from the eNB, upon detecting a DCI format of the normal TM, the UE determines that the 2-bit ARI in the DCI format of the normal TM indicates one of the PUCCH resource set 1 and selects one of A, B, C, and D according to the ARI to transmit PUCCH format 3. In addition, upon detecting a DCI format of the CoMP mode, the UE determines that the ARI indicates one of the PUCCH resource set 2 in the DCI format of the CoMP mode and selects one of A', B', C', and D' according to the ARI to transmit PUCCH format 3. Meanwhile, it may be defined that two states (e.g. 00 and 01) of the four states 00, 01, 10, and 11 of the ARI are used to indicate the normal PUCCH resource and the other two states (e.g. 10 and 11) are used to indicate the new PUCCH resource.

When the UE is configured in a CoMP mode, the UE switches or selects a PUCCH resource based on CoMP mode configuration signaling. That is, the UE configured in the CoMP mode may use a PUCCH resource reserved for CoMP upon detecting the DCI format for CoMP and the UE configured as a TM except for the CoMP mode or the UE which has detected a fallback DCI format as the CoMP mode may be operated to use a conventional dynamic PUCCH resource.

Since a newly configured PUCCH resource for a specific TM (e.g. CoMP mode) may be targeted at another RX point (RP), all or a part of parameters associated with the RX point (e.g. a virtual cell ID indicating the corresponding RX point, scrambling ID, $\Delta^{PUCCH}_{shift}$, $\delta^{PUCCH}_{offset}$, $\beta_{PUCCH}$, $N^{(1)}_{PUCCH}$, etc.) may be previously interlinked to a corresponding state. Here, the virtual cell ID is a cell ID replacing a physical cell ID (e.g. $N^{cell}_{ID}$) or a cell ID allocated to a specific point separately from the physical cell ID and may be used to configure PUCCH resources for a corresponding cell together with or instead of the physical cell ID. $\Delta^{PUCCH}_{shift}$ is a value corresponding to an interval between cyclic shifts applied to a PUCCH and is provided by a higher layer. $\delta^{PUCCH}_{offset}$ corresponds to an offset value indicating the start location of separately configured PUCCH resources according to the present invention. $\beta_{PUCCH}$ is an amplitude scaling value for a PUCCH and complex-valued symbols to be transmitted on the PUCCH are multiplied by $\beta_{PUCCH}$ so as to suit a transmit power $P_{PUCCH}$. For example, when a specific parameter(s) is linked to a corresponding state by higher-layer (e.g. RRC) signaling, if the state is indicated by an ARI, the UE may be operated to perform PUCCH transmission by applying the pre-linked specific parameter(s).

An embodiment of the present invention provides a new scheme for determining a dynamic PUCCH resource in a new PUCCH resource region corresponding to a set of new PUCCH resources. In other words, an embodiment of the present invention provides a new linkage rule for determining one of new PUCCH resources, instead of Equation 5 and Equation 6 of a conventional dynamic ACK/NACK linkage rule. It may be predicted that the UE, which has detected TM dependent DCI, may be configured to transmit UCI associated with the TM dependent DCI to the eNB using a PUCCH resource determined according to the following Equation 7 or Equation 8 and the eNB, which has transmitted the TM dependent DCI to the UE, receives the UCI on the PUCCH resource determined according to Equation 7 or Equation 8.

$$n^{(1)}_{PUCCH}=f(n_{CCE},N^{(1)}_{PUCCH},X) \quad \text{[Equation 7]}$$

$$n_{PUCCH}^{(1)}=f(n_{CCE},X) \quad \text{[Equation 8]}$$

Unlike Equation 5 and Equation 6 having only $n_{CCE}$ and $N^{(1)}_{PUCCH}$ as arguments, Equation 7 and Equation 8 determine a PUCCH resource index according to a function $f(n_{CCE},N^{(1)}_{PUCCH},X)$ having a parameter X as well as $n_{CCE}$ and $N^{(1)}_{PUCCH}$ as arguments. Here, X may be at least one of parameters (e.g. an RRC-configured resource indicator, an RB index related parameter, a virtual cell ID, a scrambling ID, $\Delta^{PUCCH}_{shift}$, $\delta^{PUCCH}_{offset}$, $\beta_{PUCCH}$, etc.) other than $n_{CCE}$ and $N^{(1)}_{PUCCH}$ or at least one combination of the above parameters. Various operators or functions may be used as f. For example, at least one of operators such as a modulo operator, an N-to-1 mapping operator, an identity operator, a linear transformer, a translator, an affine transformer, etc. or a partial combination of the above operators may be used as f.

FIG. 9 illustrates an example of determining one PUCCH resource among new PUCCH resources configured according to an embodiment of the present invention.

In Equation 7 and Equation 8, f may be an operator defined such that a new PUCCH resource region can be configured in compressed form. In other words, f may be an operator configured to map M CCEs to N (N<M) PUCCH resources where M and N are positive integers. For example, a modulo operator may be used as the following f to map CCEs of TM dependent DCI to one PUCCH resource in the new PUCCH resource region.

$$n_{PUCCH}^{(1,p=p0)}=n_{CCE} \bmod N+N_{PUCCH}^{(1)}+\delta_{PUCCH}^{(1)} \quad \text{[Equation 9]}$$

$$n_{PUCCH}^{(1,p=p0)}=n_{CCE} \bmod N+1+N_{PUCCH}^{(1)}+\delta_{PUCCH}^{(1)} \quad \text{[Equation 10]}$$

Equation 9 and Equation 10 are special types of Equation 6 or Equation 7. Equation 5 and Equation 6, for mapping a CCE index to a PUCCH resource index, are to map, for example, M CCEs to M PUCCH resources in one-to-one correspondence as illustrated in FIG. 9(a), whereas Equation 9 and Equation 10 are to map, for example, M CCEs to N (N=3 in FIG. 9(b)) PUCCH resources where N is less than M as illustrated in FIG. 9(b). Accordingly, excessive reservation of dynamic PUCCH resources can be prevented and a plurality of PUCCH resource regions can be configured. Each of the plurality of PUCCH resource regions may be allocated to a specific UE, specific UE-group, or a specific TM.

The UE configured as a new TM (e.g. CoMP mode) may be operated to determine a PUCCH resource according to Equation 7 or Equation 8 and the UE configured as a conventional TM may be operated to determine a PUCCH resource according to Equation 5 and/or Equation 6. Alternatively, the UE configured as a TM rather than a fallback mode may be operated to determine a PUCCH resource according to Equation 7 or Equation 8 and the UE configured as the fallback mode may be operated to determine a PUCCH resource according to Equation 5 and/or Equation 6.

<(Conventional or New) PUCCH Resource Selection According to CCE Index>

Meanwhile, dynamic PUCCH resources may be pre-divided into multiple resource regions according to usage and one of the resource regions may be selectively used according to DCI format or TM, or higher-layer signaling. For example, the eNB may configure two types of PUCCH resource regions (e.g. PUCCH resource region 1 and PUCCH resource region 2), previously signal the configured regions to the UE, and implicitly signal a PUCCH resource to be used by the UE out of the PUCCH resource region 1 and the PUCCH resource region 2 at a corresponding PUCCH transmission timing to the UE using a CCE index of a DCI format for a DL grant. That is, the UE may be semi-statically assigned the allocated PUCCH resource region 1 and PUCCH resource region 2 and may determine a PUCCH resource to be used at a specific PUCCH transmission timing from the PUCCH resource region 1 or the PUCCH resource region 2 according to a CCE index of a PDCCH associated with the specific PUCCH transmission timing. For example, if it is predefined that an odd CCE index is connected to the PUCCH resource 1 and an even CCE index is connected to the PUCCH resource 2, the UE may determine in which PUCCH resource region of the PUCCH resource region 1 and the PUCCH resource region 2 a PUCCH resource is selected according to whether a CCE index obtained by decoding the DL grant is an odd number or an even number. Which individual PUCCH resource in a corresponding PUCCH resource region is to be used may be implicitly/dynamically determined by the CCE index. Assuming that a PUCCH resource related to CoMP is allocated to the PUCCH resource 2, the eNB can prevent a normal UE and a CoMP UE from transmitting ACK/NACK using the same PUCCH resource by mapping the DL grant of the CoMP UE to a CCE of an even index. As another example, CCE indexes 1 to 50 may be sequentially linked to the PUCCH resource region 1 and CCE indexes 51 to 100 may be sequentially linked to the PUCCH resource region 2. Assuming that the CoMP related PUCCH resource is allocated to the PUCCH resource region 2, the eNB can prevent the CoMP UE and the normal UE from transmitting ACK/NACK using the same PUCCH resource by mapping the DL grant of the CoMP UE to one or more CCEs among CCEs having the CCE indexes 51 to 100. Upon detecting any one value of the CCE indexes 51 to 100 as $n_{CCE}$, the UE may be configured to select a PUCCH resource from the PUCCH resource region 2 and, upon detecting any one value of the CCE indexes 1 to 50 as $n_{CCE}$, the UE may be configured to select a PUCCH resource from the PUCCH resource region 1.

<(Conventional or New) PUCCH Resource Selection According to Aggregation Level or SS>

A PUCCH resource region may be selected according to a CCE aggregation level. That is, the PUCCH resource region may be determined by linking a specific aggregation level and a specific CCE index. For example, since DCI transmission by the eNB on aggregation of CCEs corresponding to a high aggregation level (e.g. an aggregation level 4 or 8) means that a DL channel state is not good, there is a high probability that the UE operates in a fallback mode at a high aggregation level. Accordingly, at a high aggregation level (e.g. an aggregation level 4 or 8), the eNB and UE may be configured to select a PUCCH resource from a conventional PUCCH resource region according to a conventional PUCCH resource linkage rule and, at a low aggregation level (e.g. an aggregation level 1 or 2), the eNB and UE may be configured to select a PUCCH resource from a new PUCCH resource region according to a newly introduced PUCCH resource linkage rule in accordance with the present invention. As another example, it may be defined that a CCE of a PDCCH in a common search space (CSS) using only a high aggregation level 4 or 8 is connected to a PUCCH resource in the conventional PUCCH resource region and a CCE of a PDCCH in a UE-specific search space (USS), except for the CSS using only a high aggregation level 4 or 8, is connected to a PUCCH resource in the new PUCCH resource region. Alternatively, a PUCCH resource region and a corresponding PUCCH resource index may be obtained depending upon a value of a specific field of a DCI format.

Due to overlap of an SS according to aggregation level, UE may recognize that DCI has transmitted at an aggregation level other than an aggregation level transmitted by the eNB. For example, assuming that a PDCCH of an aggregation level 1 or 2 is linked to a new PUCCH resource and a PDCCH of an aggregation level 4 or 8 is linked to a conventional PUCCH resource, the case in which the UE succeeds in decoding DCI at an aggregation level 2 may occur although the eNB has transmitted the DCI at an aggregation level 4. In this case, since the UE transmits the UCI using a new PUCCH resource even though the eNB is expected to receive the UCI using a conventional PUCCH resource, the eNB cannot effectively receive the UCI. To solve such a problem, an SS of a PDCCH to be linked to a conventional PUCCH resource region and an SS of a PDCCH to be linked to a new PUCCH resource region may be differently configured. For example, the eNB and UE may be configured to conform to a conventional PUCCH linkage rule when a PDCCH carrying DCI is located in a CSS and conform to a newly introduced PUCCH linkage rule according to the present invention when the PDCCH carrying the DCI is located in a USS. In other words, the eNB and UE may be configured such that a conventional physical cell ID (PCI) related parameter(s) and a cell-specific PUCCH resource index offset $N^{(1)}_{PUCCH}$ are always applied to the DCI in the CSS for a fallback operation. As another method, even when the UE succeeds in decoding the PDCCH at any aggregation level, an accurate aggregation level can be determined by causing the UE to attempt to decode the PDCCH at all the other possible aggregation level(s). If the UE succeeds in decoding the PDCCH at various aggregation levels, the UE may determine DCI received through the PDCCH of a high aggregation level as valid DCI. This is because there is no case in which the UE succeeds in decoding the PDCCH at a high aggregation level although the eNB has transmitted the PDCCH at a low aggregation level. The above two methods cause the UE to confirm an accurate aggregation level, thereby aiding in solving collision of PUCCH resources or collision of CCEs.

Alternatively, explicit or implicit linkage to other PUCCH resources is possible according to a specific antenna port, layer, or carrier.

<Operation Only in Single DCI Format in UL>

In the case of UL transmission (e.g. signal transmission through a PUSCH), only DCI format 0 may be used for scheduling of UL transmission. In this case, DCI format 0 is used for operations such as UL CoMP and UL transmission to a UL cell different from a DL cell. When only format 0 is used for PUSCH transmission, determination of the conventional PUCCH resource or new PUCCH resource based on a DCI format according to the above-described present invention cannot be applied. Accordingly, in this case, the UE needs to discern whether DCI format 0 is about a normal operation or a special operation (e.g. fallback operation) in order to determine whether to use the conventional PUCCH resource or the new PUCCH resource. This is signaled by the eNB to the UE. For example, if the UE should perform a normal operation, the eNB may inform the UE that DCI format 0 is about the normal operation by positioning DCI format 0 in an SS A (e.g. USS) or in the range of a CCE index A or using only a specific aggregation level (e.g. an aggregation level 1 or 2) and, if the UE should perform a special operation, the eNB may inform the UE that DCI format 0 is about the special operation by positioning DCI format 0 in an SS B (e.g. CSS) or in the range of a CCE index B or using only a specific aggregation level (e.g. aggregation level 4 or 8).

<Operation in Multiple DCI Formats in UL>

Meanwhile, when DCI format 0 is used as a DCI format for fallback DCI and DCI format 4 is used as a DCI format for TM dependent DCI, the UE may be configured to use PUCCH resource region 1 upon detecting DCI format 0 and PUCCH resource region 2 upon detecting DCI format 4.

If DCI format 4 is always positioned in a USS, all techniques applied when DCI format 0 is positioned in the USS may be similarly or identically applied even to DCI format 4. For example, DCI format 0 and DCI format 4 in the USS may be identically configured except for a specific field or flag to schedule PUSCH transmission using an operation associated with CoMP. The eNB may pre-configure, for CoMP, a plurality of sets of RRC parameters (e.g. a virtual cell ID (e.g. $VCID^{BSI}$) for determining a base sequence index (BSI) and another independent virtual cell ID (e.g. $VCID^{CSH}$) for initializing a cyclic shift hopping (CSH) pattern) and cause the UE to dynamically select a specific set from among the RRC parameter sets. In this case, the eNB may generate a PUSCH DMRS sequence using a specific RRC parameter set among RRC parameter sets preconfigured for the UE by addition n bits (e.g. n=1) to DCI format 0 and/or DCI format 4 and dynamically signal transmission of a PUSCH together with the PUSCH DMRS sequence to the UE. Alternatively, the eNB may generate the PUSCH DMRS sequence using a specific RRC parameter set among the RRC parameter sets by various explicit schemes (e.g. using a carrier indicator field (CIF), a CSI request field, a frequency hopping field, a resource allocation (RA) field, a cyclic shift (CS)/orthogonal cover code (OCC) field, etc.) and signal transmission of the PUSCH together with the PUSCH DMRS sequence, thereby indicating dynamic switching between the RRC parameter sets. For example, in a CoMP mode, the eNB and UE may be configured such that a conventional PCI related parameter(s) and a cell specific PUCCH resource index offset $N^{(1)}_{PUCCH}$ are always applied to DCI in a CSS for a fallback operation.

Meanwhile, a mode for dynamic switching/indication between RRC parameter sets may be enabled or disabled by higher-layer (e.g. RRC) signaling. For example, if the dynamic switching/indication mode is disabled by higher-layer signaling, a specific RRC parameter set among the RRC parameter sets may be semi-statically configured. That is, if the dynamic switching/indication mode is disabled by higher-layer signaling, the aforementioned n bits may not be added or the n bits may be regarded as meaningless even when the n bits are added. In other words, the n bits indicating a specific RRC parameter among the RRC parameter sets may be regarded as meaningful only when the dynamic switching/indication mode is enabled.

If the dynamic switching/indication mode is disabled by higher-layer signaling, a set of specific RRC parameters (e.g. a virtual cell ID (e.g. $VCID^{BSI}$) for determining a base sequence index (BSI) and another independent virtual cell ID (e.g. $VCID^{CSH}$) for initializing a cyclic shift hopping (CSH) pattern) may be semi-statically configured even with respect to a CoMP mode according to a predetermined rule. A PUCCH may include not only a virtual cell ID for generating a PUCCH sequence but also a parameter(s) (e.g. $\Delta^{PUCCH}_{shift}$, $\delta^{PUCCH}_{offset}$, $\beta_{PUCCH}$, $N^{(1)}_{PUCCH}$, etc.) related to the virtual cell ID, in a specific RRC parameter set. An SRS related parameter may also be included in the specific RRC parameter set. For example, not only the virtual cell ID for generating the SRS sequence but also parameters related to the virtual cell ID may be included in the specific RRC parameter set.

Meanwhile, if only one RRC parameter set among a plurality of RRC parameter sets is UE-specifically configured with respect to a PUSCH, a PUCCH, or SRS (hereinafter, PUSCH/PUCCH/SRS), the UE may regard this as a semi-static mode and may be configured to perform PUSCH/PUCCH/SRS transmission by applying the RRC parameter set. If a plurality of RRC parameter sets is UE-specifically configured with respect to PUSCH/PUCCH/SRS, the UE may regard this as dynamic switching between the plural RRC parameter sets and may be configured to perform an operation according to dynamic switching.

<Linkage Assignment of DL CoMP+UL CoMP>

In a CoMP scenario, a PUCCH resource region 1 and a PUCCH resource region 2 according to the present invention are configured with respect to different cells or different RX points. The PUCCH resource region 1 and the PUCCH resource region 2 may be configured based on different cell IDs or may be configured to include different PUCCH resources based on the same cell ID.

The PUCCH resource region 1 and the PUCCH resource region 2 can be prevented from generating physically colliding resources by different PUCCH resource index offsets. Among the above-described embodiments of the present invention, when the CoMP mode is configured or indicated, the embodiment using a PUCCH resource for CoMP may apply CoMP to PUCCH transmission. Hereinafter, PUCCH transmission applied to CoMP will be referred to as PUCCH CoMP. Especially, in order to naturally operate PUCCH CoMP in linkage to a DL CoMP operation, the present invention proposes an embodiment in which CoMP is not applied to PUCCH transmission using a CCE and a PUCCH resource mutually linked by a conventional CCE-to-AN linkage and CoMP is applied only to PUCCH transmission using a dynamic PUCCH resource reserved for DL CoMP. Obviously, PUCCH CoMP may independently operate from DL CoMP but PUCCH CoMP may be enabled in linkage with DL CoMP by signaling from the eNB. DL CoMP and UL CoMP may be configured as various combinations by signaling from the eNB. For example, the following combinations are possible.

1. DL CoMP (PDSCH)+UL CoMP (all PUCCHs)
2. DL CoMP (PDSCH)+UL CoMP (only CoMP PUCCH)
3. DL CoMP (PDSCH)+UL CoMP (all PUCCHs+PUSCH)
4. DL CoMP (PDSCH)+UL CoMP (only CoMP PUCCH+PUSCH)

Here, "all PUCCHs" indicates that a PUCCH using an arbitrary PUCCH resource irrespective of a conventional PUCCH resource or a PUCCH resource for CoMP may be transmitted to points other than a PDSCH TX point and "only CoMP PUCCH resource" indicates that a PUCCH using only a PUCCH resource configured for CoMP may be used for PUCCH transmission to points other than a PDSCH TX point.

During PUCCH CoMP, ACKs/NACKs may be transmitted on a PUCCH by applying the same/different CS/OCC in the same RB or may be transmitted on a PUCCH by applying the same/different CS/OCC in different RBs. That is, in the case of PUCCH CoMP, a plurality of ACKs/NACKs may be transmitted on one PUCCH in one of the following forms.

1. same PUCCH RB+same CS/OCC
2. same PUCCH RB+different CS/OCC
3. different PUCCH RB+same CS/OCC
4. different PUCCH RB+different CS/OCC Thereamong, the present invention in which a PUCCH resource is separately managed by a PUCCH resource index offset may be applied to a PUCCH transmitted in the form of cases 2, 3, and 4. As in case 4, it is desirable that a plurality of ACKs/NACKs is separately mapped to orthogonal PUCCH resources. When a plurality of ACKs/NACKs is multiplexed using the same CS/OCC in the same RB as in case 1, it is difficult to distinguish between ACKs/NACKs even when a PUCCH resource index offset according to the present invention is used. Accordingly, in case 1, a scheme for reserving a plurality of PUCCH resources according to the present invention can be effectively applied by transmitting ACKs/NACKs through different layers even when the ACKs/NACKs are transmitted in the same RB through expansion to a spatial domain.

Figure 10:
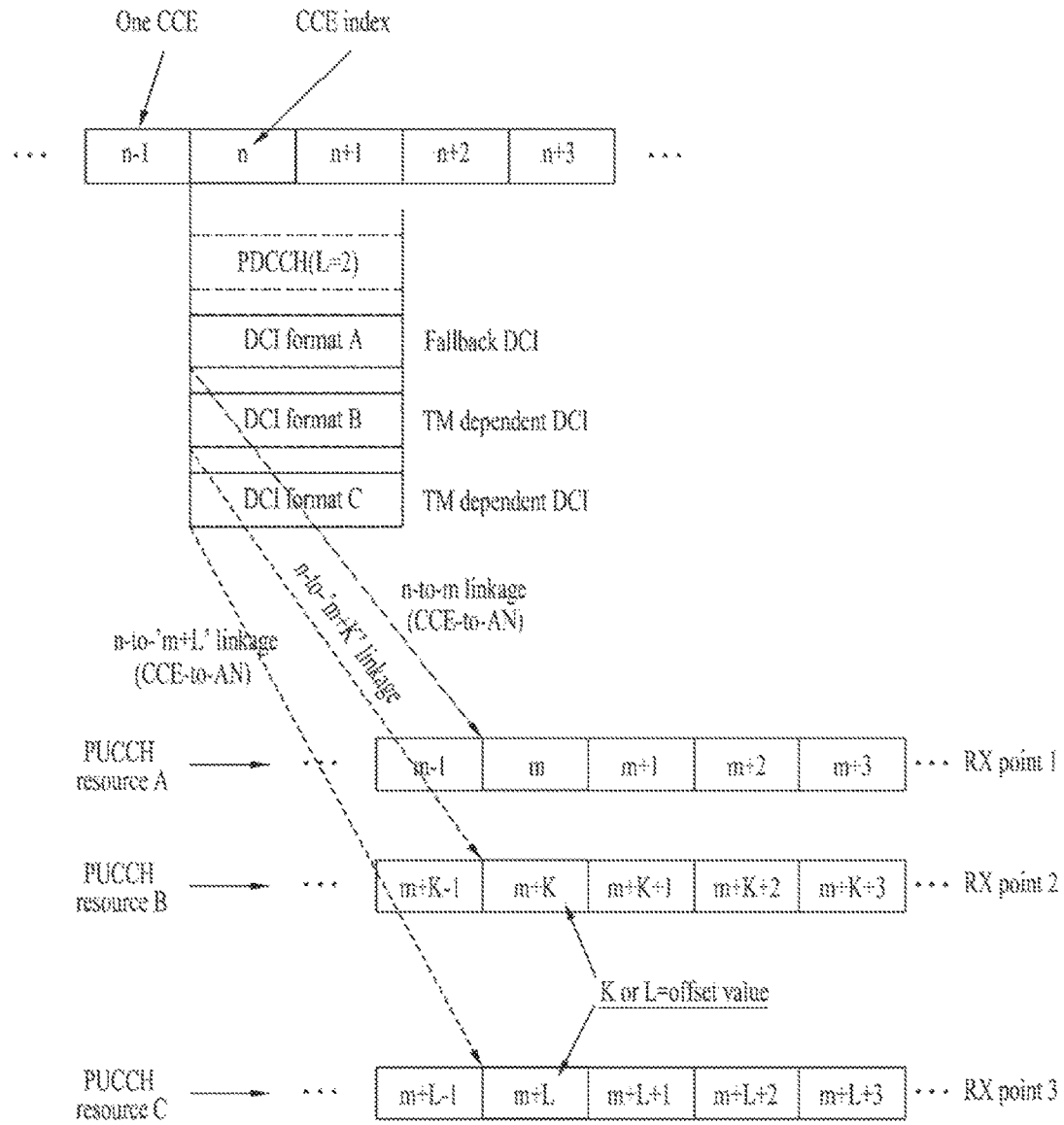
FIG. 10 illustrates another example of determining a dynamic PUCCH resource according to an embodiment of the present invention

<Application Probability to PUCCH/PUSCH CoMP (DPS) of the Present Invention>: Different Cell IDs FIG. 10 illustrates another example of determining a dynamic PUCCH resource according to an embodiment of the present invention. Particularly, FIG. 10 illustrates PUCCH resource linkage/reservation when UL dynamic point selection (DPS) is enabled.

UL DPS entails an operation of frequently changing target RX points of UL transmission. If a target RX point has a cell ID different from a conventional cell ID, PUCCH and PUSCH transmission suitable for a changed target cell should be performed. Since a resource linked to a cell ID is allocated for PUCCH transmission, the UE needs to differently generate a PUCCH resource depending on to which point a PUCCH is transmitted. Accordingly, the UE should be configured to generate the PUCCH resource according to a cell ID of a target RX point to which the PUCCH is transmitted. Meanwhile, since path loss differs according to the target RX point, it is desirable to differently set a power control offset according to the target RX point. Therefore, the present invention proposes controlling UL power per RX point. Assuming that a set of points that the UE can dynamically select is a DPS set, the UE should know, for example, a PUCCH/PUSCH/SRS power control offset per cell ID included in the DPS set and determine a power control offset of any channel of any cell every UL transmission time point, thereby applying the determined power control offset to UL transmission to a corresponding cell. The eNB may pre-configure a plurality of power control offsets to signal the configured offsets to the UE and dynamically or explicitly indicate a power control offset among the plural power control offsets so that the UE may perform UL transmission by applying the power control offset. Alternatively, the UE may select one of the plural power control offsets according to a predetermined condition so that the selected power control offset may be applied to UL transmission. Upon detecting CoMP dependent DCI, the UE may be configured to apply such an operation to a PUCCH resource reserved for CoMP. Referring to FIG. 10, the PUCCH resource reserved for CoMP may be reserved by a PUCCH resource index offset (K or L) for a conventional dynamic PUCCH resource in terms of one cell. Furthermore, when UL DPS is performed, a PUCCH resource index offset may be configured per a plurality of target RX points.

In FIG. 10, a value indicating a relative location calculated based on $N^{(1)}_{PUCCH}$ indicating the start location of dynamic PUCCH resources of a specific cell (cell of RX point 1) is used as an offset value (K or L) indicating the start location of dynamic PUCCH resources configured per RX point according to the present invention. However, a value indicating an absolute start location rather than a relative value based on $N^{(1)}_{PUCCH}$ of a specific cell may be used as the offset value indicating the start location of separately configured dynamic PUCCH resources according to the present invention.

Figure 11:
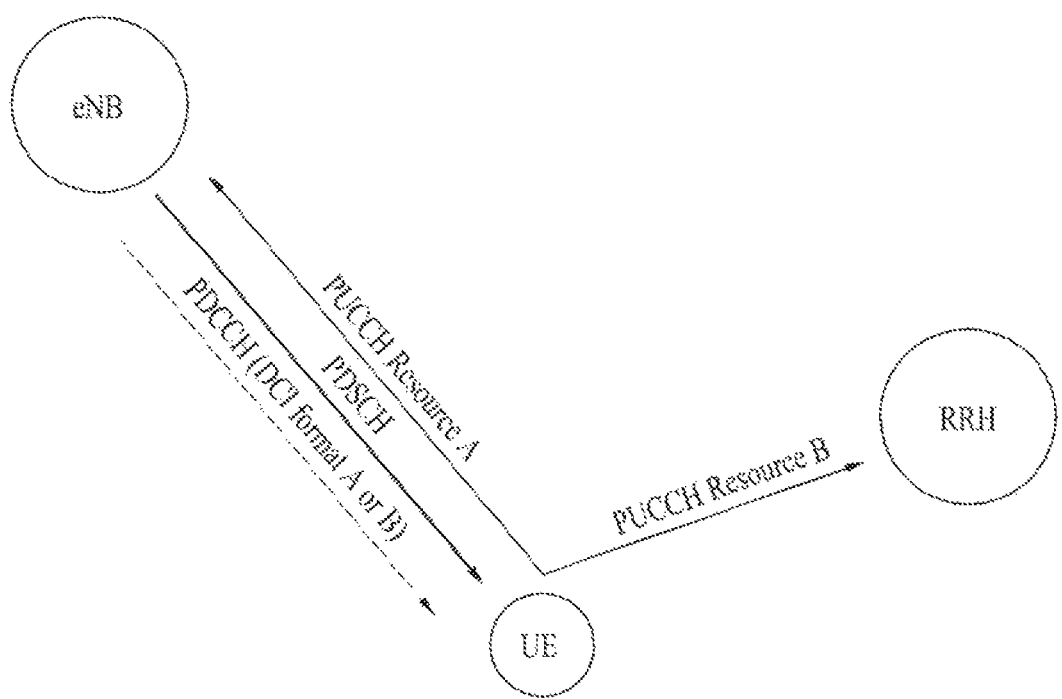
FIG. 11 illustrates another example of CoMP to which the present invention is applicable.

<Application Probability to PUCCH/PUSCH CoMP (DPS) of the Present Invention>: Same Cell ID FIG. 11 illustrates another example of CoMP to which the present invention is applicable.

A DPS set including an RRH having the same cell ID as the eNB in spite of a plurality of RX points may be configured. When all RX points in the DPS set have the same cell ID, if PUCCHs are transmitted towards different RX points, all RX points in the DPS set may share the same PUCCH resources.

However, PUCCH resources using similar UL transmit power may collectively be allocated per RX point in consideration of the fact that a UL transmit power level differs as a distance with the UE varies with an RX point. In this case, as illustrated in FIG. 10, a PUCCH resource region per RX point may be configured and the PUCCH resource region per RX point may be distinguished by a PUCCH resource index offset. A conventional DCI field such as a CIF may be reused or a new DCI format may be defined to configure an indication field in the new DCI format, so that an RX point indicating a target point may be indicated to the UE. The proposal of the present invention determining a PUCCH resource depending upon a DCI format may be applied herein. For example, although a DCI format per RX point is defined or DCI formats of the same length are used with respect to all RX points, an indication field indicating a target RX point is present when actually decoding the DCI format and a PUCCH resource region may be determined according to the indication field.

<Pre-Configuration of Multiple PUCCH Resource Regions and Dynamic Indication of One of PUCCH Resource Regions (DCI Format+CIF Combination)>

In a 3GPP LTE system, the UE is configured to blind-decode up to two DCI formats according to TM. In this case, the UE will basically perform blind decoding with respect to a fallback DCI format (e.g. DCI format 1A) and a TM dependent DCI format. According to the present invention, upon detecting a DCI format designated to achieve a special purpose such as CoMP or a newly introduced DCI format, the UE performs a pre-designated operation. A cell selection parameter(s) indicating towards which RX point the UE is to perform UL transmission, to which target cell the UE is to perform UL transmission, and which cell ID the UE uses during UL transmission may be pre-designated. In addition, selection of a PUSCH transmission parameter(s) indicating which PUSCH DMRS the UE is to use, selection of an SRS transmission parameter(s) indicating which sequence or RB is used to transmit an SRS, and selection of a PUCCH transmission parameter(s) indicating which resource (CS/OCC, RB, hopping, and cell ID) are used by a PUCCH may be pre-designated. A parameter set may be pre-configured and the UE may be configured to use the designated parameter set according to DCI format. Here, the eNB may pre-designate a plurality of parameter sets to the UE by higher-layer (e.g. RRC) signaling and may cause the UE to select one or some of the plural parameter sets so as to be used for UL transmission. If the multiple parameter sets are configured by higher-layer signaling, the UE may be configured to use a parameter set linked to specific DCI upon detecting the specific DCI. If the number of DCI formats for the plural parameter sets is one, the UE may be configured to select one of the plural parameter sets using additional information included in the DCI format. That is, according to DCI format, parameter sets reserved for the corresponding DCI format are determined and an actually used parameter set for transmission among the reserved parameter sets may be dynamically indicated to the UE by DCI transmitted through a PDCCH. Information indicating a parameter set to be applied to actual UL transmission among the reserved parameter sets may be transmitted to the UE from the eNB by reusing a CIF introduced for carrier aggregation. In carrier aggregation, the CIF is used to indicate for which CC scheduling information is carried by the corresponding DCI. The CIF may be used to indicate a parameter set instead of indicating a CC. If the CIF is used to indicate the parameter set rather than the CC, the CIF may be used as an enable signal. For example, if a DCI format for CoMP is a DCI format X, when CoMP is configured, PUCCH resources associated with the DCI format X may be pre-reserved and parameters associated with the DCI format X may also be pre-configured. However, the PUCCH resources and parameters associated with the DCI format X are only reserved without being actually used and when the DCI format X is detected by the UE, the reserved PUCCH resources and parameters are used. That is, it may be interpreted that the reserved PUCCH resources or parameters are enabled by an additional field of DCI such as a CIF together with the DCI format X. A PUCCH resource region may be implicitly determined according to a subframe instead of the CIF. For example, when subframes in which many PUCCH resources for CoMP are reserved are periodically configured, if the eNB informs the UE of the start location and configuration period of the subframes in which many PUCCH resources for CoMP are reserved, the UE may use a PUCCH resource for CoMP in subframes of the corresponding period and use a conventional PUCCH resource in the other subframes.

Meanwhile, an additional indication signal other than DCI may be used to indicate which one of reserved resources or parameters is to be used. For example, the eNB may indicate the UE that pre-reserved resources and parameters are used by transmitting the DCI format X and inform the UE which one of the resources and parameters is to be used through the additional indication signal. Upon detecting the DCI format X, the UE may discern that the pre-reserved resources and parameters can be used and discern which one of the reserved resources and parameters should be used to perform UL transmission based on the indication signal.

Upon receiving a PDSCH in DL cell 1 and transmitting a PUCCH for the PDSCH to UL cell 1 identical to the DL cell 1, the UE may transmit the PUCCH using a PUCCH resource connected to a CCE of the DL cell 1. That is, the UE transmitting the PUCCH towards the same UL RX point as a DL TX point may transmit the PUCCH using a conventional PUCCH resource. In contrast, if UL cell #m (where m is a value other than 1), which is different from the DL cell 1, is designated as a cell of an RX point, the UE may be configured to transmit the PUCCH using a PUCCH resource pre-reserved for the UL cell #m. Here, although an example of the PUCCH resource has been described, the embodiment described in this example may also be applied to transmission parameters and resources of other channels. As an example, a new DMRS sequence different from a conventional DMRS sequence may be configured and indication as to which one of the conventional DMRS sequence and the new PUSCH DMRS sequence is to be used for the PUSCH may be included in the DCI format X or may be determined by an indication signal separately transmitted from the DCI format X. Particularly, the newly configured DMRS sequence may mainly be used for a UL RX point (i.e. a UL cell) having an index (e.g. a different physical cell ID or different virtual cell ID) different from a DL TX point (i.e. a DL cell). Conversely, the newly configured DMRS may be used in a cell of a DL TX point and the conventional DMRS sequence may be used in a UL cell, which is different from the DL cell.

A dynamic switching/indication mode between pre-reserved parameter sets or a dynamic switching/indication mode between pre-reserved PUCCH resource regions may be indicated through higher-layer (e.g. RRC) signaling. For example, when the dynamic switching/indication mode is disabled by higher-layer signaling, a parameter set and a PUCCH resource region for a specific TM (e.g. CoMP mode) may be semi-statically configured and the UE may perform UL transmission using the parameter set and/or PUCCH resource region. Meanwhile, when only one parameter set is UE-specifically configured, the UE may regard this as a semi-static mode and may be configured to perform UL transmission by applying the corresponding parameter set. When a plurality of RRC parameter sets is UE-specifically configured, the UE may recognize that dynamic switching should be performed between the plural parameter sets and may be configured to perform an operation according to dynamic switching.

If a DL cell is different from a UL cell, a target UL cell may be designated using a CIF. Such a situation may occur when cells of different size, such as in a heterogeneous network (Hetnet), coexist. As an example, when a PDSCH 1 is transmitted to the UE in a DL cell 1 and the UE transmits a PUCCH for the PDSCH 1 to a UL cell 2 (in this case, a PUSCH is generally also transmitted to the UL cell 2), the eNB should inform the UE that the UL cell 2 is a target RX point of UL transmission. The eNB may indicate the target UL cell to the UE using a CIF value in a DCI format. Instead of the CIF, an additional signaling bit performing such an indication function may be added to the DCI format.

The foregoing embodiments may be applied not only to a DCI format for a CoMP mode but also to a DCI format for other TMs. For example, a PUCCH resource may be reserved with respect to a fallback DCI format according to a conventional rule and additional dynamic PUCCH resources according to the present invention may be configured with respect to a DCI format according to a TM. Upon detection of the fallback DCI format, the UE may determine a dynamic PUCCH resource according to the convention rule and, upon detection of a TM dependent DCI format according to a corresponding TM, the UE may determine a dynamic PUCCH resource among separately configured PUCCH resources. In other words, the embodiments of the present invention may be extended and applied to a normal TM dependent DCI format as well as a DCI format for a CoMP mode.

Figure 12:
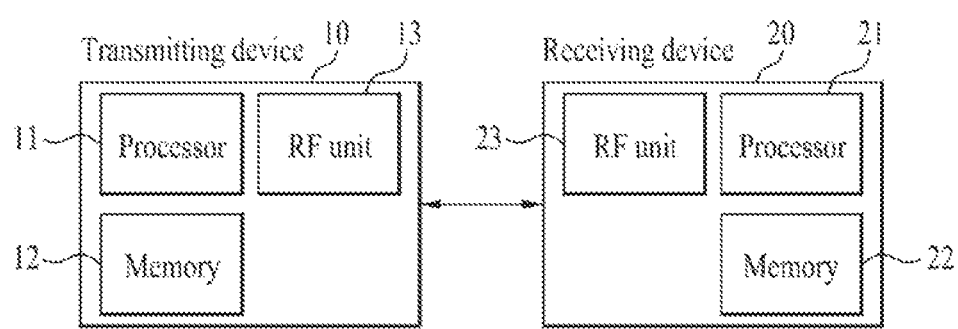
FIG. 12 is a block diagram illustrating elements of a transmitting device 10 and a receiving device 20 for implementing the present invention.

FIG. 12 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of it represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, the processor, RF unit, and memory included in the UE will be referred to as a UE processor, a UE RF unit, and a UE memory, respectively, and the processor, RF unit, and memory unit included in the eNB will be referred to as an eNB processor, an eNB RF unit, and an eNB memory, respectively.

According to the embodiments of the present invention, the eNB processor controls the eNB RF unit to transmit a PDCCH and/or a PDSCH and the UE processor controls the UE RF unit to receive the PDCCH and/or the PDSCH. According to the embodiments of the present invention, the UE processor controls the UE RF unit to transmit the PUCCH and the PUSCH and the eNB processor controls the eNB RF unit to receive the PUCCH and the PUSCH. In the present invention, each RX/TX point may include at least one RF unit. Although a DL TX point may be different from a UL RX point when CoMP is configured, since points participating in CoMP will be controlled by one eNB processor or by coordinated eNB processors, the embodiments of the present invention will be described hereinafter under the assumption that the same eNB transmits a DL signal and receives a UL signal when one of points participating in CoMP transmits the DL signal to the UE and one of points participating in CoMP receives the UL signal from the UE. For example, even when an eNB transmitting a PUCCH resource index offset for dynamic PUCCH resources is different from an eNB receiving UCI using a PUCCH resource based on the PUCCH resource index offset, the embodiments of the present invention will be described under the assumption that the same eNB transmits the DL signal and receives the UL signal according to the present invention. However, the embodiments of the present invention may be applied even when an eNB transmitting the DL signal is different from an eNB receiving the UL signal.

The eNB processor may control the eNB RF unit to transmit information indicating a TM to the UE. In addition, the eNB processor may configure a plurality of PUCCH resource regions. The eNB processor may control the eNB RF unit to transmit location information (e.g. a start PUCCH resource index) capable of specifying locations of the plural PUCCH resource regions to the UE. For example, the eNB processor may control the eNB RF unit to transmit, to the UE, one or more PUCCH resource index offsets for the TM as well as $N^{(1)}_{PUCCH}$ which is a cell-specific PUCCH resource index offset. Each PUCCH resource index offset may correspond to one cell.

The UE RF unit receives a DL signal from the eNB and transmits the DL signal to the UE processor. The UE processor attempts to decode a PDCCH in a CSS and/or USS in a subframe in order to receive DCI. The UE processor may detect/receive the DCI transmitted by the eNB thereto by decoding the DL signal received on the PDCCH in the CSS and/or USS to a DCI format (hereinafter, a DCI format X) and/or a fallback DCI format according to the TM. When the DCI has been successfully decoded according to the DCI format X, the UE processor may operate in the TM and when the DCI has been successfully decoded according to the fallback DCI format, the UE processor may operate in a fallback mode. When the DCI is DCI for a DL grant, the UE processor controls the UE RF unit to receive DL data through a PDSCH according to the DL grant. The UE processor may generate ACK/NACK information for the DL data and control the UE RF unit to transmit the ACK/NACK information. Upon successfully decoding the DCI to the DCI format X (i.e. detecting the DCI of the DCI format X), the UE processor may control the UE RF unit to transmit the ACK/NACK information using a PUCCH resource in a PUCCH resource region configured for the DCI format X and, upon successfully decoding the DCI to the fallback DCI format (i.e. upon detecting the DCI of the fallback DCI format), the UE processor may control the UE RF unit to transmit the ACK/NACK information using a PUCCH resource in a PUCCH resource region configured for the fallback DCI format. The PUCCH resource region for the fallback DCI format may be a conventional dynamic PUCCH resource region and the start location thereof may be determined by $N^{(1)}_{PUCCH}$. Which PUCCH resource among the PUCCH resources including in the PUCCH resource region is to be used may be determined based on an index ($n_{CCE}$) of a (first) CCE in the PDCCH carrying the DCI. For example, the UE processor may determine a PUCCH resource for ACK/NACK information about a PDSCH by the fallback DCI format according to Equation 5 and/or Equation 6. The UE processor may determine a PUCCH resource for ACK/NACK information for a PDSCH by the DCI format X from among PUCCH resources configured for the DCI format X, that is, for the TM, based on $n_{CCE}$. For example, the UE processor may determine a PUCCH resource for the ACK/NACK information for the PDSCH by the DCI format X according to one of Equation 7 to Equation 10.

Meanwhile, upon detecting the DCI format, the UE processor may control the UE RF unit and/or the UE memory to perform a pre-designated operation. A cell selection parameter(s) indicating towards which RX point the UE RF unit is to perform UL transmission, to which target cell the UE RF unit is to perform UL transmission, and which cell ID the UE uses during UL transmission may be pre-designated. In addition, selection of a PUSCH transmission parameter(s) indicating which PUSCH DMRS the UE processor is to use, selection of an SRS transmission parameter(s) indicating which sequence or RB is used to transmit an SRS, and selection of a PUCCH transmission parameter(s) indicating which resource (CS/OCC, RB, hopping, and cell ID) a PUCCH is to use may be pre-designated. A parameter set may be pre-configured by the eNB processor and information about the configured parameter set may be transmitted to the UE by the eNB RF unit. The UE processor may be configured to use the designated parameter set according to DCI format. The eNB processor may pre-designate a plurality of parameter sets and configure the information about the configured parameter set as a higher-layer signal. The eNB processor may control the eNB RF unit to transmit the higher-layer signal. The UE RF unit may receive the higher-layer signal and transmit the received higher-layer signal to the UE processor. The UE processor may select one or some of the plural parameter sets to be used for UL transmission. Upon detecting specific DCI, the UE processor may be configured to use a specific parameter set linked to the specific DCI. If the number of DCI formats for the plural parameter sets is one, the UE processor may be configured to select one of the plural parameter sets using additional information included in the DCI format. The eNB processor may control the eNB RF unit to transmit information about a parameter set that the UE desires to use for actual transmission among the parameter sets reserved by the eNB for the specific DCI format to the UE through a PDCCH. For instance, the eNB processor may use a CIF to indicate one of the plural parameter sets.

Meanwhile, an additional indication signal other than DCI may be used to indicate which one of reserved resources or parameters is to be used. For example, the eNB processor may control the eNB RF unit to transmit the DCI format X to the UE and control the eNB RF unit to transmit the additional indication signal indicating which one of the resource and parameter should be used to the UE. Upon detecting the DCI format X, the UE processor may discern that the pre-reserved resources and parameters can be used and discern which one of the reserved resources and parameters should be used to perform UL transmission based on the indication signal.

When the UE RF unit receives a PDSCH in DL cell 1 and transmits a PUCCH for the PDSCH to UL cell 1 which is the same point as the DL cell 1, the UE processor may control the UE RF unit to transmit UCI (e.g. ACK/NACK information) through the PUCCH using a PUCCH resource connected to a CCE of the DL cell 1. In contrast, if UL cell #m (where m is a value other than 1), which is different from DL cell 1, is designated as a cell of an RX point, the UE processor may control the UE RF unit to transmit the UCI through the PUCCH using a PUCCH resource pre-reserved for the UL cell #m.

Meanwhile, the eNB processor may pre-divide dynamic PUCCH resources into multiple resource regions according to usage. For instance, one PUCCH resource region among the multiple resource regions may be selected and used according to DCI format or TM, or higher-layer signaling. For example, it may be pre-defined that a set of some CCE indexes is connected to a PUCCH resource region 1 and a set of the other CCE indexes is connected to a PUCCH resource region 2. The UE processor may determine in which PUCCH resource region of the PUCCH resource region 1 and the PUCCH resource region 2 a PUCCH resource is selected according to a set of CCE indexes to which a CCE index obtained by decoding a DL grant belongs. The UE processor may implicitly/dynamically determine which individual PUCCH resource in a corresponding PUCCH resource region is to be used based on a CCE index. The eNB processor can prevent ACK/NACK for a DL grant of a CoMP UE and ACK/NACK for a DL grant of a normal UE from being transmitted using the same PUCCH resource, by allocating the DL grant of the CoMP UE and the DL grant of the normal UE to CCEs linked to different PUCCH resource regions.

A PUCCH resource region may be selected according to a CCE aggregation level. That is, the PUCCH resource region may be determined by linking a specific aggregation level and a specific CCE index. For example, the UE processor may select a PUCCH resource from a conventional PUCCH resource region according to a conventional PUCCH resource linkage rule with respect to DCI detected at a high aggregation level (e.g. an aggregation level 4 or 8) and select a PUCCH resource from a new PUCCH resource region according to a newly introduced PUCCH resource linkage rule of the present invention with respect to DCI detected at a low aggregation level (e.g. an aggregation level 1 or 2). As another example, the UE processor may use a CCE of a PDCCH in a CSS using only a high aggregation level 4 or 8 to determine a PUCCH resource in the conventional PUCCH resource region and use a CCE of a PDCCH in a USS, except for the CSS using only a high aggregation level 4 or 8, to determine a PUCCH resource in the new PUCCH resource region. Alternatively, the UE processor may obtain a PUCCH resource region and a corresponding PUCCH resource index depending upon a value of a specific field of a DCI format.

To prevent a situation in which the UE recognizes that DCI has been transmitted at an aggregation level other than an aggregation level transmitted by the eNB due to overlap of an SS according to aggregation level, the eNB processor may differently configure an SS to be linked to the conventional PUCCH resource region and an SS to be linked to the new PUCCH resource region. For example, the UE processor may determine a PUCCH resource according to a conventional PUCCH linkage rule when a PDCCH carrying DCI is located in the CSS and determine a PUCCH resource from among new PUCCH resources according to a newly introduced PUCCH linkage rule of the present invention when the PDCCH carrying the DCI is located in the USS. As an example, the UE processor may determine a PUCCH resource by always applying a conventional PCI related parameter(s) and a cell-specific PUCCH resource index offset $N^{(1)}_{PUCCH}$ to the DCI in the CSS, for a fallback operation. As another method, even when the PDCCH is successfully decoded a PDCCH at any aggregation level, the UE processor may be configured to cause the UE to attempt to decode all other possible aggregation level(s) so as to determine an accurate aggregation level.

In the case in which only format 0 is used for UL transmission, the eNB processor may control the eNB RF unit to transmit information as to whether a corresponding UE should use a conventional PUCCH resource or a new PUCCH resource to the UE. For example, if the UE should perform a normal operation, the eNB processor may inform the UE that DCI format 0 is about the normal operation by positioning DCI format 0 in an SS A (e.g. USS) or in the range of a CCE index A or using only a specific aggregation level (e.g. an aggregation level 1 or 2) and, if the UE should perform a specific operation, the eNB processor may inform the UE that DCI format 0 is about the special operation by positioning DCI format 0 in an SS B (e.g. CSS) or in the range of a CCE index B or using only a specific aggregation level (e.g. aggregation level 4 or 8).

Meanwhile, when DCI format 0 is used as a DCI format for fallback DCI and DCI format 4 is used as a DCI format for TM dependent DCI, the UE processor controls the UE RF unit to transmit UCI using a PUCCH resource in PUCCH resource region 1 upon detecting DCI format 0 and using a PUCCH resource in PUCCH resource region 2 upon detecting DCI format 4.

The eNB processor may pre-configure a plurality of sets of RRC parameters (e.g. a virtual cell ID (e.g. $VCID^{BSI}$) for determining a BSI and another independent virtual cell ID (e.g. $VCID^{CSH}$) for initializing a CSH pattern) and control the eNB RF unit to transmit information indicating the configured parameter sets to the UE. The eNB processor may add n bits (e.g. n=1) to DCI format 0 in a USS and/or DCI format 4 in the USS in order to indicate a specific parameter set among the RRC parameter sets. In addition, the eNB processor may control the eNB RF unit to transmit various explicit signals (e.g. a CIF, a CSI request field, a frequency hopping field, an RA field, a CS/OCC field, etc.) to the UE. The UE processor may determine a specific parameter set to be used for UL transmission among the plural parameter sets based on the explicit signals. The UE processor may generate a PUSCH DMRS sequence using the specific parameter set and control the UE RF unit to transmit a PUSCH together with the PUSCH DMRS sequence.

Meanwhile, the eNB processor may enable/disable a dynamic switching/indication mode between the plural RRC parameter sets by higher-layer (e.g. RRC) signaling. If the dynamic switching/indication mode is disabled by higher-layer signaling, a set of specific RRC parameters (e.g. a virtual cell ID (e.g. $VCID^{BSI}$) for determining a BSI and another independent virtual cell ID (e.g. $VCID^{CSH}$) for initializing a CSH pattern) may be semi-statically configured even with respect to a CoMP mode according to a predefined rule.

Meanwhile, while a plurality of PUCCH resource regions configured according to the embodiments of the present invention may be distinguished by PUCCH resource index offsets, the PUCCH resource regions may overlap each other or may be exclusively configured according to how PUCCH resource index offsets are actually configured. In addition, the arrangement of the PDCCH in the data region rather than the control region of FIG. 3 is considered and the PDCCH transmitted/received in the data region is particularly referred to as an e-PDCCH. The present invention may be applied even when a PUCCH resource region for the e-PDCCH transmitted/received in the data region is separately configured from a dynamic PUCCH resource region for a PDCCH transmitted/received in the control region. The PUCCH resource region for the e-PDCCH may be UE-specifically configured. A resource used for transmission of a UL PUCCH indicating whether a PDSCH has successfully been transmitted (ACK/NACK or Scheduling Request (SR) determined by a cyclic shift and an orthogonal cover sequence) is configured by a higher-layer signal (e.g. RRC signal). Especially, since a PUCCH resource is configured by an RRC signal, the resource is not efficiently used and the structure thereof is not suitable to frequently change resource configuration. However, since an embedded PDCCH (e-PDCCH) is used with an additional index different from a PDCCH CCE index, the e-PDCCH has a problem with difficulty of incorporation in a CCE-to-AN resource linkage rule of a PDCCH. Accordingly, in order to allocate a dynamic AN resource, an offset signal indicating the start position of a PUCCH resource region, $N_{offset}^{e-PUCCH}$ (associated with e-PDCCH) which is an additional offset signal such as $N_{offset}^{PUCCH}$, are needed. In this method, since a resource region associated with a PDCCH CCE is dynamically changed, $N_{offset}^{e-PUCCH}$ should be configured by sufficiently considering this region. Meanwhile, when MIMO is used, one or more e-PDCCHs may be present in the same RB or RBG and thus collision between PUCCH resources is expected. In this case, it is proposed that different PUCCH resources be allocated by differently configuring a scrambling ID or an antenna port used to decode an embedded PDCCH and using the configured information to determine the PUCCH resources. As another issue, if it is obliged that only one subframe of two subframes such as a subframe using only a PDCCH and a subframe using only an e-PDCCH is exclusively used, the following method is proposed. For example, when only a PDCCH is present in a specific frame, a PUCCH resource may be used by dynamically allocating subsequent resources using $N_{offset}^{PUCCH}$ as is conventionally used. When only an e-PDCCH (e.g. R-PDCCH) is present in a specific subframe, a resource reserved as $N_{offset}^{PUCCH}$ is used. That is, a method in which an uplink PUCCH resource shares the same resource irrespective of a PDCCH or an e-PDCCH is proposed. By doing so, waste of unnecessarily reserving resources in two exclusive regions can be prevented. Obviously, if the waste is negligible because of a small number of e-PDCCHs and a small quantity of reserved e-PUCCH resource, independent resources allocated to the e-PDCCHs can be used. To this end, an eNB may inform a UE of a signal indicating in which subframe only a PDCCH is present or in which subframe only an e-PDCCH is present through a higher-layer signal such as RRC. More generally, the eNB may inform the UE that a different value of $N_{offset}^{PUCCH}$ per subframe should be used.

According to the present invention, the risk of collision between PUCCH resources when a cell transmitting a DL signal is different from a cell receiving a UL signal can be prevented. Accordingly, the PUCCH resources can be efficiently used.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, an RN, a UE, or other devices in a wireless communication system.

The invention claimed is:

1. A method for transmitting, by a user equipment, an uplink signal in a wireless communication system, the method comprising:
   receiving, by the user equipment, a first PUCCH resource offset associated with a first type physical downlink control channel (PDCCH) and a second PUCCH resource offset associated with a second physical downlink control channel (e-PDCCH);
   detecting, by the user equipment, at least the PDCCH located in a control region of a subframe or the e-PDCCH located in a data region of the subframe; and
   transmitting, by the user equipment, a physical uplink control information (PUCCH) carrying acknowledgement/negative acknowledgement (ACK/NACK) information associated with the PDCCH or the e-PDCCH,
   wherein the PUCCH is transmitted using a PUCCH resource, and
   wherein the PUCCH resource is determined based on a lowest index of a PDCCH allocation unit included in the PDCCH and the first PUCCH resource offset when the ACK/NACK information is associated with the PDCCH, and the PUCCH resource is determined based on a lowest index of an e-PDCCH allocation unit included in the e-PDCCH and the second PUCCH resource offset when the ACK/NACK information is associated with the e-PDCCH.

2. The method according to claim 1, wherein the second PUCCH resource offset is specific to the user equipment.

3. The method according to claim 1, wherein the first PUCCH resource offset is specific to the user equipment.

4. The method according to claim 1, wherein the first PUCCH resource offset is received in addition to a cell specific PUCCH resource offset.

5. The method according to claim 1, further comprising:
   receiving, by the user equipment, subframe information indicating in which subframe the e-PDCCH can be received.

6. An user equipment for transmitting an uplink signal in a wireless communication system, the user equipment comprising:
   a radio frequency (RF) unit configured to transmit/receive a signal; and
   a processor configured to control the RF unit, the processor configured to:
   control the RF unit to receive a first PUCCH resource offset associated with a first type physical downlink control channel (PDCCH) and a second PUCCH resource offset associated with a second physical downlink control channel (e-PDCCH);
   detect at least the PDCCH located in a control region of a subframe or the e-PDCCH located in a data region of the subframe; and
   control the RF unit to transmit a physical uplink control information (PUCCH) carrying acknowledgement/negative acknowledgement (ACK/NACK) information associated with the PDCCH or the e-PDCCH,
   wherein the PUCCH is transmitted using a PUCCH resource, and
   wherein the PUCCH resource is determined based on a lowest index of a PDCCH allocation unit included in the PDCCH and the first PUCCH resource offset when the ACK/NACK information is associated with the PDCCH, and the PUCCH resource is determined based on a lowest index of an e-PDCCH allocation unit included in the e-PDCCH and the second PUCCH resource offset when the ACK/NACK information is associated with the e-PDCCH.

7. The user equipment according to claim 6, wherein the second PUCCH resource offset is specific to the user equipment.

8. The user equipment according to claim 6, wherein the first PUCCH resource offset is specific to the user equipment.

9. The user equipment according to claim 6, wherein the first PUCCH resource offset is received in addition to a cell specific PUCCH resource offset.

10. The user equipment according to claim 6, wherein the processor is configured to control the RF unit to receive subframe information indicating in which subframe the e-PDCCH can be received.

11. A method for receiving, by a base station, an uplink signal from a user equipment in a wireless communication system, the method comprising:
    transmitting, by the base station, a first PUCCH resource offset associated with a first type physical downlink control channel (PDCCH) and a second PUCCH resource offset associated with a second physical downlink control channel (e-PDCCH);
    transmitting, by the base station, at least the PDCCH located in a control region of a subframe or the e-PDCCH located in a data region of the subframe; and
    receiving, by the base station, a physical uplink control information (PUCCH) carrying acknowledgement/negative acknowledgement (ACK/NACK) information associated with the PDCCH or the e-PDCCH,
    wherein the PUCCH is received using a PUCCH resource, and
    wherein the PUCCH resource is determined based on a lowest index of a PDCCH allocation unit included in the PDCCH and the first PUCCH resource offset when the ACK/NACK information is associated with the PDCCH, and the PUCCH resource is determined based on a lowest index of an e-PDCCH allocation unit included in the e-PDCCH and the second PUCCH resource offset when the ACK/NACK information is associated with the e-PDCCH.

12. The method according to claim 11, wherein the second PUCCH resource offset is specific to the user equipment.

13. The method according to claim 11, wherein the first PUCCH resource offset is specific to the user equipment.

14. The method according to claim 11, wherein the first PUCCH resource offset is transmitted in addition to a cell specific PUCCH resource offset.

15. The method according to claim 11, further comprising:

transmitting, by the base station, subframe information indicating in which subframe the e-PDCCH can be transmitted.

16. A method for receiving, by a base station, an uplink signal from a user equipment in a wireless communication system, the method comprising:

a radio frequency (RF) unit configured to transmit/receive a signal; and a processor configured to control the RF unit, the processor configured to:

control the RF unit to transmit a first PUCCH resource offset associated with a first type physical downlink control channel (PDCCH) and a second PUCCH resource offset associated with a second physical downlink control channel (e-PDCCH);

control the RF unit to transmit at least the PDCCH located in a control region of a subframe or the e-PDCCH located in a data region of the subframe; and control the RF unit to receive a physical uplink control information (PUCCH) carrying acknowledgement/negative acknowledgement (ACK/NACK) information associated with the PDCCH or the e-PDCCH, wherein the PUCCH is received using a PUCCH resource, and wherein the PUCCH resource is determined based on a lowest index of a PDCCH allocation unit included in the PDCCH and the first PUCCH resource offset when the ACK/NACK information is associated with the PDCCH, and the PUCCH resource is determined based on a lowest index of an e-PDCCH allocation unit included in the e-PDCCH and the second PUCCH resource offset when the ACK/NACK information is associated with the e-PDCCH.

17. The base station according to claim 16, wherein the second PUCCH resource offset is specific to the user equipment.

18. The base station according to claim 16, wherein the first PUCCH resource offset is specific to the user equipment.

19. The base station according to claim 16, wherein the first PUCCH resource offset is transmitted in addition to a cell specific PUCCH resource offset.

20. The base station according to claim 16, wherein the processor is configured to control the RF unit to transmit subframe information indicating in which subframe the e-PDCCH can be transmitted.

* * * * *